(12) United States Patent
Yoshida et al.

(10) Patent No.: US 8,879,371 B2
(45) Date of Patent: Nov. 4, 2014

(54) RECORDING MEDIUM

(71) Applicants: Pioneer Corporation, Kanagawa (JP);
Memory-Tech Holdings Inc., Tokyo (JP)

(72) Inventors: Masayoshi Yoshida, Kanagawa (JP);
Takuya Shiroto, Kanagawa (JP); Hideki Kobayashi, Kanagawa (JP); Masakazu Ogasawara, Kanagawa (JP); Takao Tagiri, Kanagawa (JP); Makoto Suzuki, Tokyo (JP)

(73) Assignees: Pioneer Corporation, Kanagawa (JP);
Memory-Tech Holdings Inc., Tokyo (JP)

( * ) Notice: Subject to any disclaimer, the term of this patent is extended or adjusted under 35 U.S.C. 154(b) by 0 days.

(21) Appl. No.: 13/746,369

(22) Filed: Jan. 22, 2013

(65) Prior Publication Data
US 2013/0188469 A1    Jul. 25, 2013

(30) Foreign Application Priority Data

Jan. 20, 2012  (JP) .................................. 2012-010085

(51) Int. Cl.
| G11B 7/004 | (2006.01) |
| G11B 7/24038 | (2013.01) |
| G11B 7/2405 | (2013.01) |
| G11B 7/09 | (2006.01) |

(52) U.S. Cl.
CPC .......... *G11B 7/24038* (2013.01); *G11B 7/2405* (2013.01); *G11B 7/0938* (2013.01)

USPC .... 369/44.26; 369/44.38; 369/94; 369/275.4; 369/277; 369/286; 720/718

(58) Field of Classification Search
None
See application file for complete search history.

(56) References Cited

U.S. PATENT DOCUMENTS

| 2009/0279412 A1* | 11/2009 | Hirotsune et al. ......... 369/275.4 |
| 2012/0002519 A1* | 1/2012 | Horigome .................. 369/275.4 |

FOREIGN PATENT DOCUMENTS

| JP | 07-192265 | 7/1995 |
| JP | 08-045080 | 2/1996 |
| JP | 08-279160 | 10/1996 |
| JP | 09-147366 | 6/1997 |
| JP | 11-328746 | 11/1999 |
| JP | 2001-307344 | 11/2001 |
| JP | 2003-323725 | 11/2003 |
| JP | 2004-178781 | 6/2004 |

* cited by examiner

*Primary Examiner* — Wayne Young
*Assistant Examiner* — Brian Butcher
(74) *Attorney, Agent, or Firm* — Young & Thompson

(57) ABSTRACT

A recording medium is provided with: a guide layer on which a guide track or tracks are formed; and a plurality of recording layers, wherein a same mark group is formed in a same rotational phase position of each of a plurality of guide tracks which are included in a beam spot of guide laser light, the mark group including a pair of record marks which are shifted by a predetermined distance toward a right side and a left side, respectively, from a track center.

7 Claims, 23 Drawing Sheets

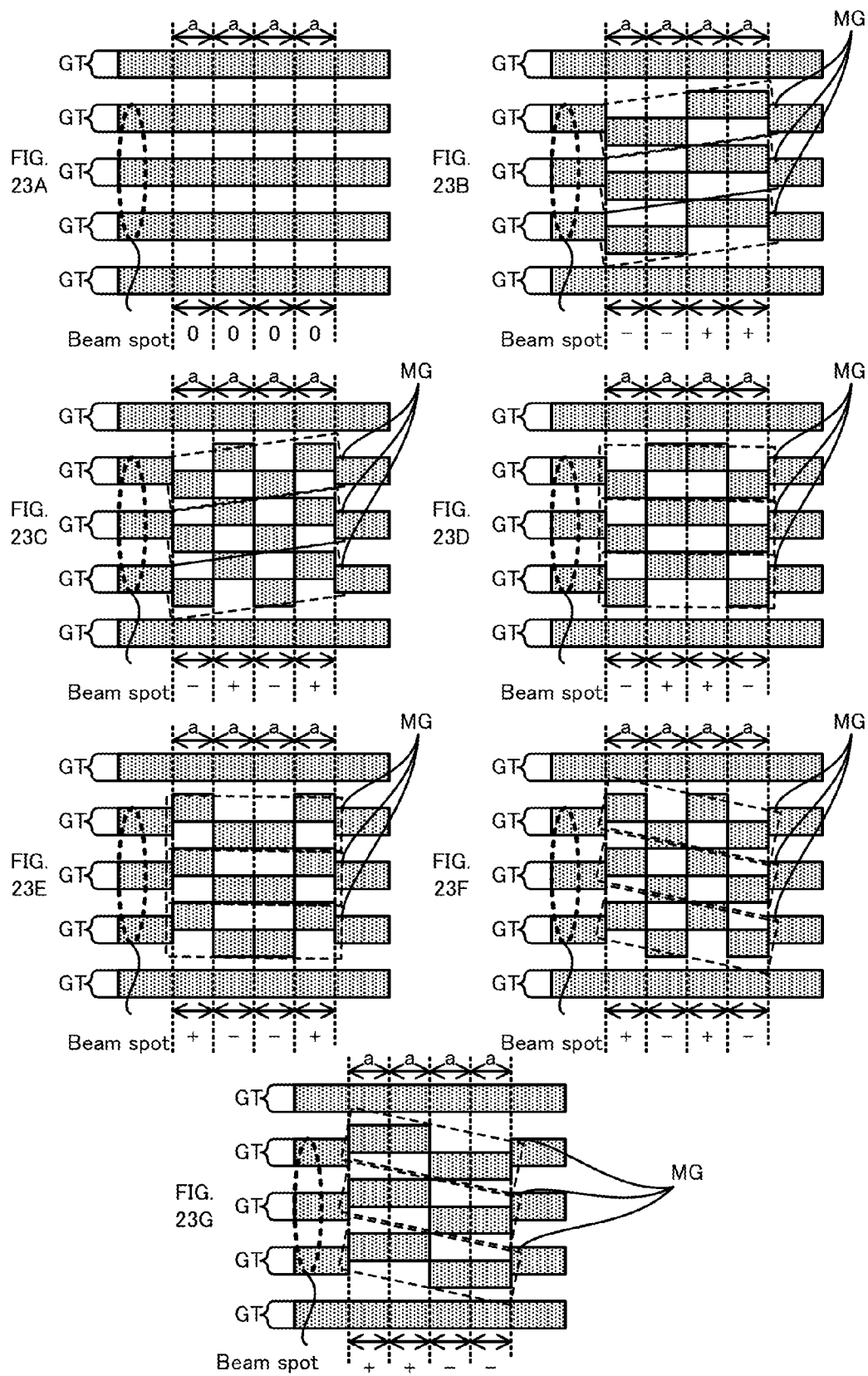

RECORDING MEDIUM

CROSS-REFERENCE TO RELATED APPLICATIONS

This application is based upon and claims the benefit of priority of the prior Japanese Patent Application No. 2012-010085, file on Jan. 20, 2012, the entire contents of which are incorporated herein by reference.

FIELD

The present invention relates to a recording medium, such as, for example, an optical disc provided with many recording layers.

BACKGROUND

As the recording medium provided with many recording layers, for example, there is known a recording medium having a plurality of recording layers, each of which is actually a target for at least one of a recording operation and a reproduction operation, and a guide layer on which a guide track or guide tracks for tracking are formed (e.g. a so-called guide layer separation type optical disc) (refer to Patent document 1). A recording/reproducing apparatus for performing at least one of the recording operation and the reproduction operation on such a recording medium irradiates guide laser light and recording/reproduction laser light. The guide laser light is light for reading the guide track(s) on the guide layer. The recording/reproduction laser light is light for performing at least one of the recording operation and the reproduction operation on the recording layer. The recording/reproducing apparatus performs at least one of the recording operation and the reproduction operation by irradiating the recording layer with the recording/reproduction laser light while performing tracking control on the basis of a push-pull signal obtained from return light of the guide laser light.

Incidentally, Patent document 2 to Patent document 8 can be listed as background art documents related to the present invention described later, although they do not disclose the guide layer separation type optical disc.

Patent document 1: Japanese Patent No. 4037034
Patent document 2: Japanese Patent No. 3729467
Patent document 3: Japanese Patent Application Laid Open No. 2003-323725
Patent document 4: Japanese Patent Application Laid Open No. 2004-178781
Patent document 5: Japanese Patent Application Laid Open No. Hei 8-279160
Patent document 6: Japanese Patent Application Laid Open No. Hei 8-45080
Patent document 7: Japanese Patent No. 3205154
Patent document 8: Japanese Patent No. 3693813

SUMMARY

By the way, the recording medium as described above is requested to record some data (e.g. data indicating control information, such as address information, clock information, recording start timing information, etc.) in the guide layer in advance. In this case, what is supposed as one example is a method of recording the data into the guide layer by forming a combination of record marks and record spaces in the guide layer, as in a combination of record marks and record spaces recorded in the recording layer.

However, in the case where the data is recorded into the guide layer by forming the combination of the record marks and the record spaces in the guide layer, the recording/reproducing apparatus needs to obtain, from the return light of the guide laser light, not only the push-pull signal for tracking but also a RF signal (a so-called sum signal) for reading the control information. However, the simultaneous obtainment of both the push-pull signal and the RF signal causes such a technical problem that it likely has some influence on the accuracy of the obtainment of the push-pull signal, because characteristics of the push-pull signal is different from those of the RF signal. In other words, the simultaneous obtainment of both the push-pull signal and the RF signal causes such a technical problem that it has some influence on the tracking control, which is an intended and primary purpose of the guide layer.

It is therefore an object of the present invention to provide a recording medium capable of preferably recording the data, while suppressing the influence on the tracking control, with respect to the guide layer on which the guide track or guide tracks for tracking are formed, in the optical disc provided with many recording layers described above.

This application discloses a recording medium which is provided with: a guide layer on which a guide track or guide tracks for tracking are formed; and a plurality of recording layers laminated on the guide layer, wherein a same mark group is formed in a same rotational phase position of each of at least two guide tracks out of a plurality of guide tracks which are included in a beam spot which is formed on the guide layer by guide laser light irradiated on the guide layer, the mark group includes a pair of record marks which are shifted by a predetermined distance toward a right side and a left side, respectively, from a track center of the each guide track The nature, utility, and further features of this invention will be more clearly apparent from the following detailed description with reference to a preferred embodiment of the invention when read in conjunction with the accompanying drawings briefly described below.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 23A to FIG. 23G are plan views illustrating a sixth modified example of the aspect in which many types of data are recorded by the mark groups formed on the groove tracks;

DESCRIPTION OF EMBODIMENT

Figure 1:
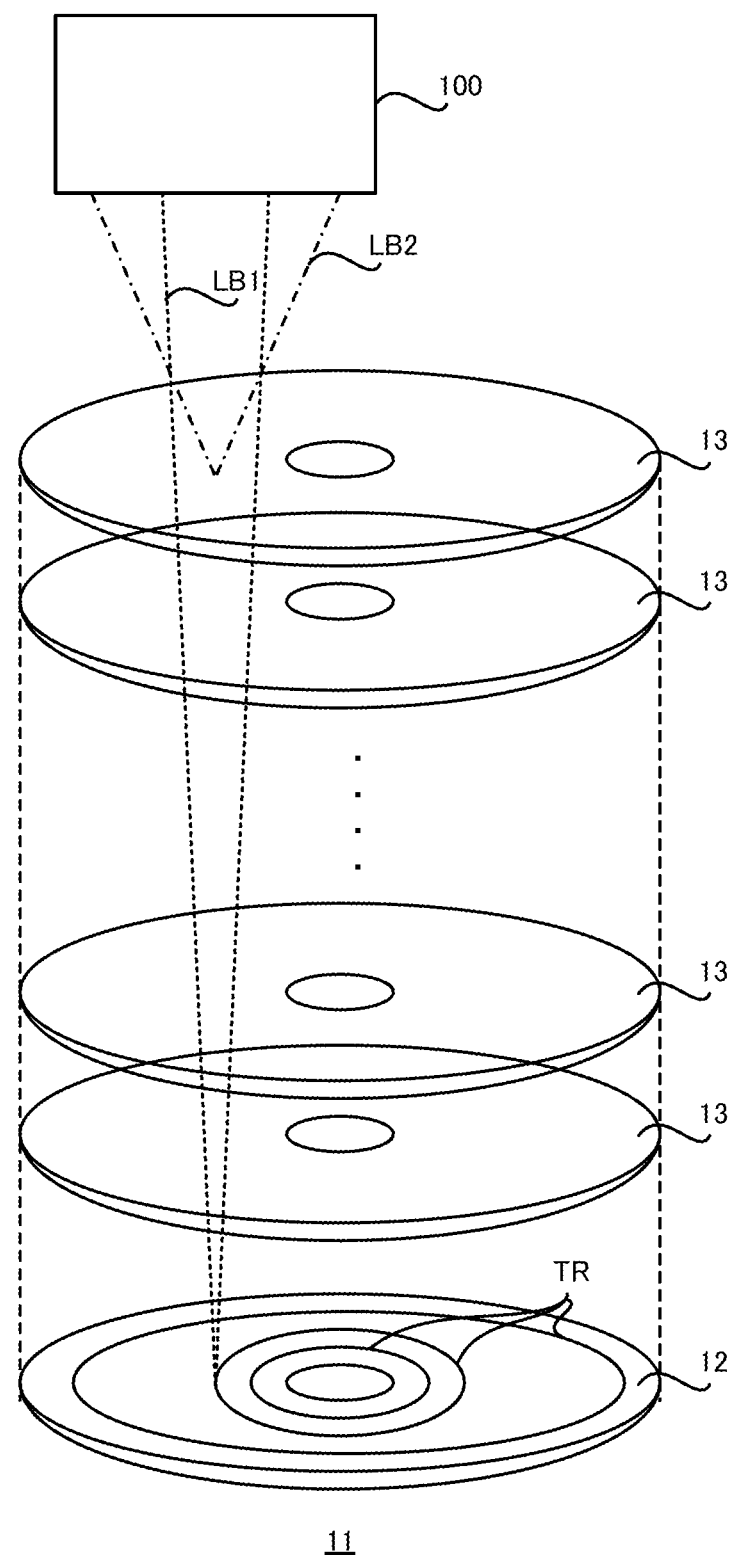
FIG. 1 is a schematic perspective view in which visualization of each layer is facilitated by spacing out a plurality of layers which constitute one optical disc, in lamination direction thereof (in a vertical direction in FIG. 1)

Hereinafter, an embodiment of the recording medium will be explained in order.

<1> The embodiment of the recording medium is provided with: a guide layer on which a guide track or guide tracks for tracking are formed; and a plurality of recording layers laminated on the guide layer, wherein a same mark group is formed in a same rotational phase position of each of at least two guide tracks out of a plurality of guide tracks which are included in a beam spot which is formed on the guide layer by guide laser light irradiated on the guide layer, the mark group includes a pair of record marks which are shifted by a predetermined distance toward a right side and a left side, respectively, from a track center of the each guide track.

According to the recording medium in the embodiment, it is provided with the guide layer and the plurality of recording layers. In the guide layer, the guide track or guide tracks for tracking are formed. Thus, a recording/reproducing apparatus for performing at least one of a recording operation and a reproduction operation on the recording medium (more specifically, on the plurality of recording layers provided for the recording medium) can obtain a push-pull signal according to a positional relation between the guide track(s) and the beam spot of the guide laser light on the basis of return light of the guide laser light irradiated onto the guide layer (i.e. guide laser light reflected by the guide layer). As a result, the recording/reproducing apparatus can perform tracking control on the basis of the push-pull signal.

In the embodiment, the mark group is formed on the guide layer. Specifically, the mark group is formed in the same rotational phase position of each of at least two guide tracks out of the plurality of guide tracks which are included in the beam spot which is formed on the guide layer by guide laser light. In other words, the same mark group indicating the same bit data (e.g. bit data indicating 1 bit to several bits or dozen bits) is formed in each of the at least two guide tracks out of the plurality of guide tracks which are included in the beam spot of the guide laser light such that one mark group is adjacent to another mark group along a direction perpendicular to a direction of travel of the guide tracks. At this time, the mark group is formed in each of the at least two guide tracks out of the plurality of guide tracks which are included in the beam spot which is formed by the guide laser light on the guide layer. In other words, the number of the guide tracks on each of which the same mark group is formed is less than or equal to the number of the guide tracks which are included in the beam spot of the guide laser light and is greater than or equal to 2.

Moreover, the mark group formed in the same rotational phase position of each of the at least two guide tracks is the mark group including the pair of record marks which are shifted by the predetermined distance toward the right side and the left side, respectively, from the track center of the guide track. In other words, the mark group is a mark group including in an arbitrary aspect one or more pairs of record marks, each pair including a record mark shifted by the predetermined distance to the left side from the track center and a record mark shifted by the predetermined distance to the right side from the track center. As such a pair of record marks, there can be listed as one example: a pair of record marks in which the record mark shifted by the predetermined distance to the left side from the track center and the record mark shifted by the predetermined distance to the right side from the track center are arranged in this order along the direction of travel of the guide track; and a pair of record marks in which the record mark shifted by the predetermined distance to the right side from the track center and the record mark shifted by the predetermined distance to the left side from the track center are arranged in this order along the direction of travel of the guide track. Therefore, the mark group may be a mark group including only one pair of record mark (i.e. a mark group which corresponds to one pair of record marks), or a mark group obtained by combining one or more pairs of record marks as described above in an arbitrary aspect. Alternatively, the mark group may be a mark group obtained by combining one or more pairs of record marks as described above with another record mark (e.g. a record mark located on the track center) in an arbitrary aspect.

A more specific configuration will be exemplified and explained. For example, it is assumed that the beam spot of the guide laser light includes three guide tracks. In this case, the same mark group is formed in the same rotational phase position of each of at least two guide tracks out of the k-th guide track (where k is an integer of 1 or more), the (k+1)-th guide track and the (k+2)-th guide track. For example, the same mark group is formed in a position of the k-th guide track at which the rotational phase position is x degrees (where x is a real number satisfying 0≤x≤360) and a position of the (k+2)-th guide track at which the rotational phase position is x degrees. More specifically, for example, a mark group may be formed in a position of the first guide track at which the rotational phase position is 10 degrees and a position of the third guide track at which the rotational phase position is 10 degrees, wherein the mark group may includes the pair of record marks in which the record mark shifted by the predetermined distance to the left side from the track center and the record mark shifted by the predetermined distance to the right side from the track center are arranged in this order along the direction of travel of the guide track. On the other hand, for example, a mark group may be formed in a position of the fourth guide track at which the rotational phase position is 60 degrees and a position of the sixth guide track at which the rotational phase position is 60 degrees, wherein the mark group may include the pair of record marks in which the record mark shifted by the predetermined distance to the right side from the track center and the record mark shifted by the predetermined distance to the left side from the track center are arranged in this order along the direction of travel of the guide track.

Incidentally, all the mark groups formed on the guide layer are not always the mark group including the pair of record marks described above. For example, one portion of the mark groups formed on the guide layer may be a mark group which is exactly the pair of record marks described above (or which is a combination of the one or more pairs of record marks described above), while another portion of the mark groups formed on the guide layer may be an arbitrary record mark which does not include the pair of record marks described above.

According to the recording medium in the embodiment in which the mark group as described above is formed, it has the following advantage.

Firstly, according to the embodiment, the mark group formed on the guide layer is the mark group including the pair of record marks which are shifted by the predetermined distance toward the right side and the left side, respectively, from the track center of the guide track. Thus, even if the mark group as described above is formed on the guide layer, an average value of a variation in a signal level of the push-pull signal which can be influenced by the mark group is zero (including, however, a margin small enough to be considered substantially zero). Therefore, the presence of the mark group hardly has or does not have an adverse influence on the tracking control based on the push-pull signal. Therefore, the recording/reproducing apparatus can perform at least one of the recording operation and the reproduction operation on the plurality of recording layers while performing the preferable tracking control.

On the other hand, by assigning different bit data to the mark groups in accordance with a difference of a combination of the pair of record marks which constitutes the mark group, the bit data can be recorded onto the guide layer by using the mark group. The bit data as described above (i.e. a difference of a combination of the pair of record marks) can be easily read by monitoring a change in an instantaneous value of the variation in the signal level of the push-pull signal. Therefore, according to the embodiment, it is possible to record onto the guide layer the bit data that can be read by using the push-pull signal. In other words, according to the embodiment, it is possible to record, onto the guide layer, the bit data that does not have to be read by using a RF signal (i.e. a sum signal). Therefore, the recording/reproducing apparatus can perform at least one of the recording operation and the reproduction operation on the plurality of recording layers, while preferably reading the bit data according to the mark group formed in advance on the guide layer, on the basis of the push-pull signal.

In addition, according to the embodiment, the same mark group is formed in the same rotational phase position of each of the at least two guide tracks out of the plurality of guide tracks which are included in the beam spot of the guide laser light. Therefore, as detailed later by using the drawings, the recording/reproducing apparatus can read the bit data according to the mark group without any influence of a deviation (so-called defocus) of a focus offset of the guide laser light.

As described above, according to the recording medium in the embodiment, with respect to the guide layer on which the guide track or guide tracks for tracking are formed, it is possible to preferably record data (e.g. the aforementioned bit data, etc.) while suppressing an influence on the tracking control.

<2> In another aspect of the embodiment of the recording medium, a depth of the pair of record marks is less than $\lambda/6n$ (where $\lambda$ is a wavelength of the guide laser light and n is a substrate refractive index of the recording medium).

According to this aspect, both the tracking control and the reading of the mark group (i.e. the reading of the bit data indicated by the mark group) are performed by using the push-pull signal as described above, and thus, it is possible to set the depth of the record mark in accordance with characteristics of the signal level of the push-pull signal. In other words, it is possible to set the depth of the record mark in accordance with the characteristics of the signal level of the push-pull signal without considering characteristics of the signal level of the RF signal.

<3> In another aspect of the embodiment of the recording medium, a depth of the pair of record marks is $\lambda/8n$ (where $\lambda$ is a wavelength of the guide laser light and n is a substrate refractive index of the recording medium).

According to this aspect, both the tracking control and the reading of the mark group (i.e. the reading of the bit data indicated by the mark group) are performed by using the push-pull signal as described above, and thus, it is possible to set the depth of the record mark to a depth which can realize the best characteristics of the signal level of the push-pull signal. In other words, it is possible to set the depth of the record mark to the depth which can realize the best characteristics of the signal level of the push-pull signal without considering the characteristics of the signal level of the RF signal.

<4> In another aspect of the embodiment of the recording medium, the same mark group is formed in the same rotational phase position of each of the plurality of guide tracks.

According to this aspect, the same mark group is formed in the same rotational phase position of each of the plurality of guide tracks which are included in the beam spot of the guide laser light. In other words, the same mark group is formed in the same rotational phase positions of all the plurality of guide tracks which are included in the beam spot of the guide laser light. That is, the number of the guide tracks on each of which the same mark group is formed is substantially equal to the number of the guide tracks which are included in the beam spot of the guide laser light. Incidentally, the expression of "substantially equal" herein in effect includes a state which can be considered substantially equal in view of a margin of the size of the beam spot which can vary depending on a state of the focus offset (e.g. an amount of the focus offset). Therefore, as detailed later by using the drawings, the recording/reproducing apparatus can read the bit data according to the mark group without any influence of the deviation (so-called defocus) of the focus offset of the guide laser light.

<5> In another aspect of the embodiment of the recording medium, the same mark group is formed in the same rotational phase position of each of other guide tracks other than at least one guide track located near a center, out of the plurality of guide tracks.

According to this aspect, the mark group does not have to be formed on at least one (preferably, one) guide track located near the center of the plurality of guide tracks, out of the plurality of guide tracks which are included in the beam spot of the guide laser light. Thus, the formation of the mark group (i.e. the manufacturing of the recording medium on which the mark group as described above is formed) is relatively simplified.

<6> In another aspect of the embodiment of the recording medium, the same mark group including the pair of record marks is formed in the same rotational phase position of each of other guide tracks other than at least one guide track located on the outermost side out of the plurality of guide tracks, and an another mark group is formed in the same rotational phase position of the at least one guide track located on the outermost side, the another mark group including a single record mark which is shifted by the predetermined distance toward a center of the beam spot from the track center of the at least one guide track, instead of the pair of record marks.

According to this aspect, one portion of the pair of record marks, which constitutes the mark group, formed on the outermost guide track is likely not included in the beam spot of the guide laser light. Thus, according to this aspect, one record mark of the pair of record marks which is likely not included in the beam spot of the guide laser light does not have to be shifted from the track center. Thus, the formation of the mark group (i.e. the manufacturing of the recording medium on which the mark group as described above is formed) is relatively simplified.

<7> In another aspect of the embodiment of the recording medium, the mark group includes (i) a mark group including the pair of record marks and (ii) a mark group obtained by combining the pair of record marks with another record mark located on the track center of the each guide track.

According to this aspect, in addition to the mark group including the pair of record marks, the mark group obtained by combining the pair of record marks with the another record mark located on the track center is also formed on the guide layer. Thus, the recording/reproducing apparatus can also recognize a variation in the signal level of the push-pull signal according to the another record mark located on the track center (i.e. a variation at so-called zero level which is a reference value of the signal level), in addition to the variation in the signal level of the push-pull signal according to the pair of record marks, by reading the mark group obtained by combining the pair of record marks and the another record mark located on the track center. Therefore, the recording/reproducing apparatus can preferably recognize the variation in the signal level of the push-pull signal according to the pair of record marks, on the basis of the signal level of the push-pull signal according to the another record mark located on the track center, even if the reference value of the signal level of the push-pull signal varies (e.g. even if an offset of a DC component is generated). Therefore, the recording/reproducing apparatus can preferably read the bit data recorded on the guide layer by using the mark group.

<8> In aspect of the embodiment of the recording medium in which the mark group obtained by combining the pair of record marks with another record mark located on the track center of the each guide track is formed, the mark group including the pair of record marks is a mark group indicating predetermined bit data to be recorded into the guide layer, and the mark group obtained by combining the pair of record marks with another record mark located on the track center is a mark group indicating synchronous data for synchronization when the bit data is read.

By virtue of such a configuration, the recording/reproducing apparatus reads the synchronous data before reading the bit data, and thus can recognize a variation in the reference value of the signal level of the push-pull signal. Therefore, the recording/reproducing apparatus can preferably read the bit data recorded on the guide layer by using the mark group, even if the reference value of the signal level of the push-pull signal varies.

<9> In aspect of the embodiment of the recording medium, the mark group is formed by combining the pair of record marks such that an average value of a signal level of a push-pull signal is zero, the push-pull signal being obtained by irradiating the guide laser light onto the mark group.

According to this aspect, even if the mark group as described above is formed on the guide layer, the average value of the variation in the signal level of the push-pull signal which can be influenced by the mark group is zero (including, however, a margin small enough to be considered substantially zero). Therefore, the presence of the mark group hardly has or does not have an adverse influence on the tracking control based on the push-pull signal.

<10> In aspect of the embodiment of the recording medium, the mark group is formed such that the number of record marks shifted toward the left side from the track center is equal to the number of record marks shifted to the right side from the track center.

According to this aspect, even if the mark group as described above is formed on the guide layer, the average value of the variation in the signal level of the push-pull signal which can be influenced by the mark group is zero (including, however, a margin small enough to be considered substantially zero). Therefore, the presence of the mark group hardly has or does not have an adverse influence on the tracking control based on the push-pull signal.

<11> In aspect of the embodiment of the recording medium, a plurality of different mark groups are discretely formed on the guide layer.

According to this aspect, by combining a plurality of different bit data according to the plurality of different mark groups discretely formed, it is possible to record control information (e.g. address information, clock information, recording start timing information, etc.), whose size can be larger than the size of the bit data, onto the guide layer. Thus, the recording/reproducing apparatus can read the control information, which is relatively larger in size than the bit data, by combining the plurality of different bit data according to the plurality of different mark groups discretely formed. Therefore, the recording/reproducing apparatus can perform at least one of the recording operation and the reproduction operation with respect to the plurality of recording layers, on the basis of the control information.

<12> In aspect of the embodiment of the recording medium, one mark group formed in a same rotational phase position of each of a plurality of guide tracks including one guide track in a center thereof is formed in a first rotational phase position different from a second rotational phase position in which another mark group formed in a same rotational phase position of each of a plurality of guide tracks including another guide track in a center thereof, which is different from the one guide track.

According to this aspect, at least one portion of one mark group and at least one portion of another mark group, which is different from the one mark group, are not repetitively formed in the same rotational phase position of the same guide track. Therefore, even if the same mark group is formed on each of the plurality of guide tracks, one mark group is preferably formed without any influence of (i.e. interference with) another mark group. Thus, even if the same mark group is formed on each of the plurality of guide tracks, the recording/reproducing apparatus can preferably read one mark group without any influence of (i.e. interference with) another mark group.

<13> In aspect of the embodiment of the recording medium, the guide tracks include groove tracks and land tracks alternately formed, a mark group is formed in a same rotational phase position of each of a plurality of groove tracks which are included in the beam spot, the mark group including a pair of record marks which are shifted by a predetermined distance toward a right side and a left side, respectively, from a track center of the each groove track, and a mark group is formed in a same rotational phase position of each of a plurality of land tracks which are included in the beam spot, the mark group including a pair of record marks which are shifted by a predetermined distance toward a right side and a left side, respectively, from a track center of the each land track.

According to this aspect, the mark group is formed on both the groove tracks and the land tracks. Therefore, if the guide laser light is irradiated on either the groove tracks or the land tracks, the bit data according to the mark group can be read.

<14> In aspect of the embodiment of the recording medium in which the mark group is formed on the land track, the mark group formed on the land track is formed as a mark group which is formed simultaneously with formation of two groove tracks adjacent to the land track.

By virtue of such a configuration, the mark group formed on the land track is formed, relatively easily.

The operation and other advantages of the embodiment will become more apparent from example explained below.

As explained above, the recording medium in the embodiment is provided with the guide layer and the plurality of recording layers, and the same mark group is formed in the same rotational phase position of each of at least two guide tracks out of the plurality of guide tracks which are included in the beam spot of the guide laser light, the mark group including the pair of record marks which are shifted by the predetermined distance toward the right side and the left side, respectively, from the track center. Therefore, with respect to the guide layer on which the guide track or guide tracks for tracking are formed, it is possible to preferably record data while suppressing an influence on the tracking control.

EXAMPLE

Hereinafter, an example will be explained with reference to the drawings.

(1) Configuration of Optical Disc

Figure 2:
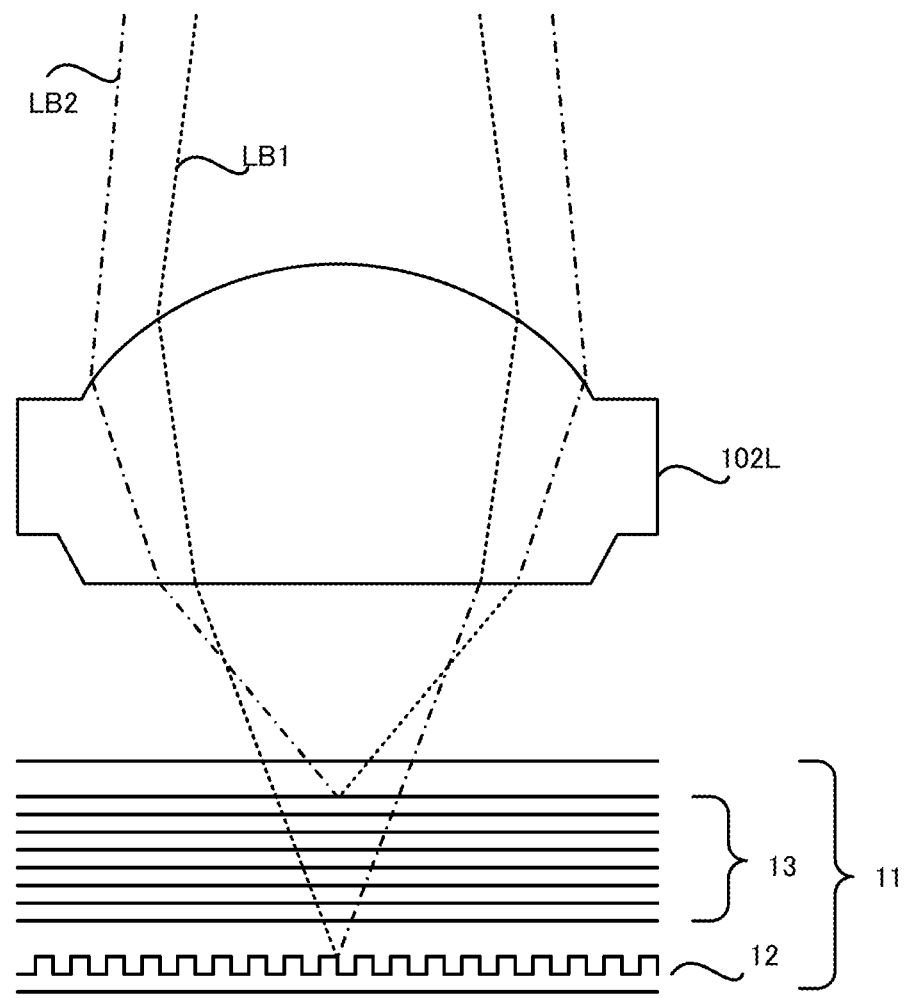
FIG. 2 is a cross sectional view illustrating a cross section of the optical disc, together with aspects of irradiating guide laser light and recording/reproduction laser light.

Firstly, with reference to FIG. 1 and FIG. 2, a configuration of an optical disc 11 will be explained. FIG. 1 is a schematic perspective view in which visualization of each layer is facilitated by spacing out a plurality of layers which constitute one optical disc 11, in lamination direction thereof (in a vertical direction in FIG. 1). FIG. 2 is a cross sectional view illustrating a cross section of the optical disc 11, together with aspects of irradiating guide laser light LB1 and recording/reproduction laser light LB2.

As illustrated in FIG. 1, the optical disc 11 is provided with a single guide layer 12 and a plurality of (i.e. two or more) recording layers 13. In other words, the optical disc 11 is a so-called guide layer separation type optical disc.

When a recording operation for the optical disc 11 (particularly, a recording operation for a desired recording layer 13) is performed, the guide laser light LB1 for tracking, which is focused on the guide layer 12, and the recording/reproduction laser light LB2, which is focused on each of the plurality of recording layers 13, are simultaneously irradiated from a recording/reproduction apparatus 100. On the other hand, when a reproduction operation for the optical disc 11 (particularly, a reproduction operation for a desired recording layer 13) is performed, the guide laser light LB1 and the recording/reproduction laser light LB2 are also simultaneously irradiated from the recording/reproduction apparatus 100. However, when the reproduction operation for the optical disc 11 is performed, the recording/reproduction laser light LB2 may be used for tracking (i.e. the guide laser light LB1 may not be used).

The optical disc 11 preferably adopts a CLV method. On concentric or spiral guide tracks TR (specifically, groove tracks GT and land tracks LT described later), control information (e.g. clock information, address information, recording start timing information, etc.) is recorded in advance in accordance with the CLV method. In the example, the control information as described above is recorded by using mark groups MG (refer to FIG. 4A to FIG. 4C and FIG. 6A to FIG. 6C) each of which includes a pair of record marks ML and MR (refer to FIG. 3 and FIG. 5) which are equidistantly shifted toward a right side and a left side, respectively, from a track center. The mark group MG is preferably formed on the guide layer 12 (i.e. the guide tracks TR provided for the guide layer 12) in advance at the time of manufacture of the optical disc 11. Incidentally, the mark group MG including the pair of the record marks ML and MR will be described in detail later, with reference to FIG. 3 and the drawings thereafter.

Incidentally, the guide tracks TR formed on the guide layer 12 may be a single spiral. In this case, the groove track GT preferably changes to the land track LT in a predetermined area of the guide layer 12. In the same manner, the land track LT preferably changes to the groove track GT in a predetermined area of the guide layer 12 of the guide layer 12. The guide tracks TR may be double spirals including the groove track GT and the land track LT which are separated.

As illustrated in FIG. 2, the recording/reproduction laser light LB2 is focused on one desired recording layer 13 which is a recording target or a reproduction target, out of the plurality of recording layers 13 laminated on the guide layer 12. The recording/reproduction laser light LB2 is a blue laser beam with a relatively short wavelength, for example, as in a Blu-ray disc (BD). On the other hand, the guide laser light LB1 is a red laser beam with a relatively long wavelength, for example, as in a DVD. The diameter of a beam spot formed on the guide layer 12 by the guide laser light LB1 is, for example, several times as large as the diameter of a beam spot formed on the recording layer 13 by the recording/reproduction laser light LB2.

Each of the plurality of recording layers 13 is a recording layer in which record information can be optically recorded or reproduced, independently. More specifically, each of the plurality of recording layers 13 is made of a semitransparent thin film including a two-photon absorption material. For example, following materials can be used as the two-photon absorption material: a fluorescent type using a fluorescent material in which fluorescent intensity changes in an area in which two-photon absorption occurs; a refractive-index change type using a photorefractive material in which a refractive index changes due to electron localization; and the like. As the two-photon absorption material of the refractive-index change type, the use of a photochromic compound, a bis(alkylidene)cycloalkanone, or the like is highly expected.

As an optical disc structure using the two-photon absorption material, there are (i) a bulk type in which the entire optical disc 11 is made of the two-photon absorption material and (ii) a layered structure type in which the recording layers 13 made of the two-photon absorption material and spacer layers made of another transparent material are alternately laminated. The layered structure type has the advantage that focus control can be performed by using light reflected on a border between one recording layer 13 and the spacer layer. The bulk type has the advantage that it has less multilayer film formation processes and production costs can be kept low.

Each of the plurality of recording layers 13 may be made of, for example, a dye material or the like, in addition to the two-photon absorption material and the phase-change material described above. In each of the plurality of recording layers 13, the guide tracks TR are not formed in advance in an unrecorded state, and for example, the entire area is a mirror surface or a smooth plane.

Incidentally, in the explanation below, it is assumed that the groove tracks GT and the land tracks LT have a straight structure, for convenience of explanation. The groove tracks GT and the land tracks LT, however, may be wobbled, as occasion demands. For example, each of the groove tracks GT or the lands tracks LT may be formed by that a reflective film, which is made of, for example, a photorefractive material, is formed on a transparent film, which is a base material with uneven grooves formed, and is further buried under a transparent or opaque film, which is a protective film. The side walls of the groove tracks GT and the land tracks LT as described above may be wobbled.

(2) Configuration of Mark Groups Formed on Guide Layer

Next, with reference to FIG. 3 to FIG. 6, an explanation will be given to a configuration of the mark groups MG (i.e. the mark groups MG each of which includes the pair of record marks ML and MR which are equidistantly shifted toward the right side and the left side, respectively, from the track center) formed on the guide layer 12.

(2-1) Configuration of Mark Groups Formed on Groove Tracks

Figure 3:
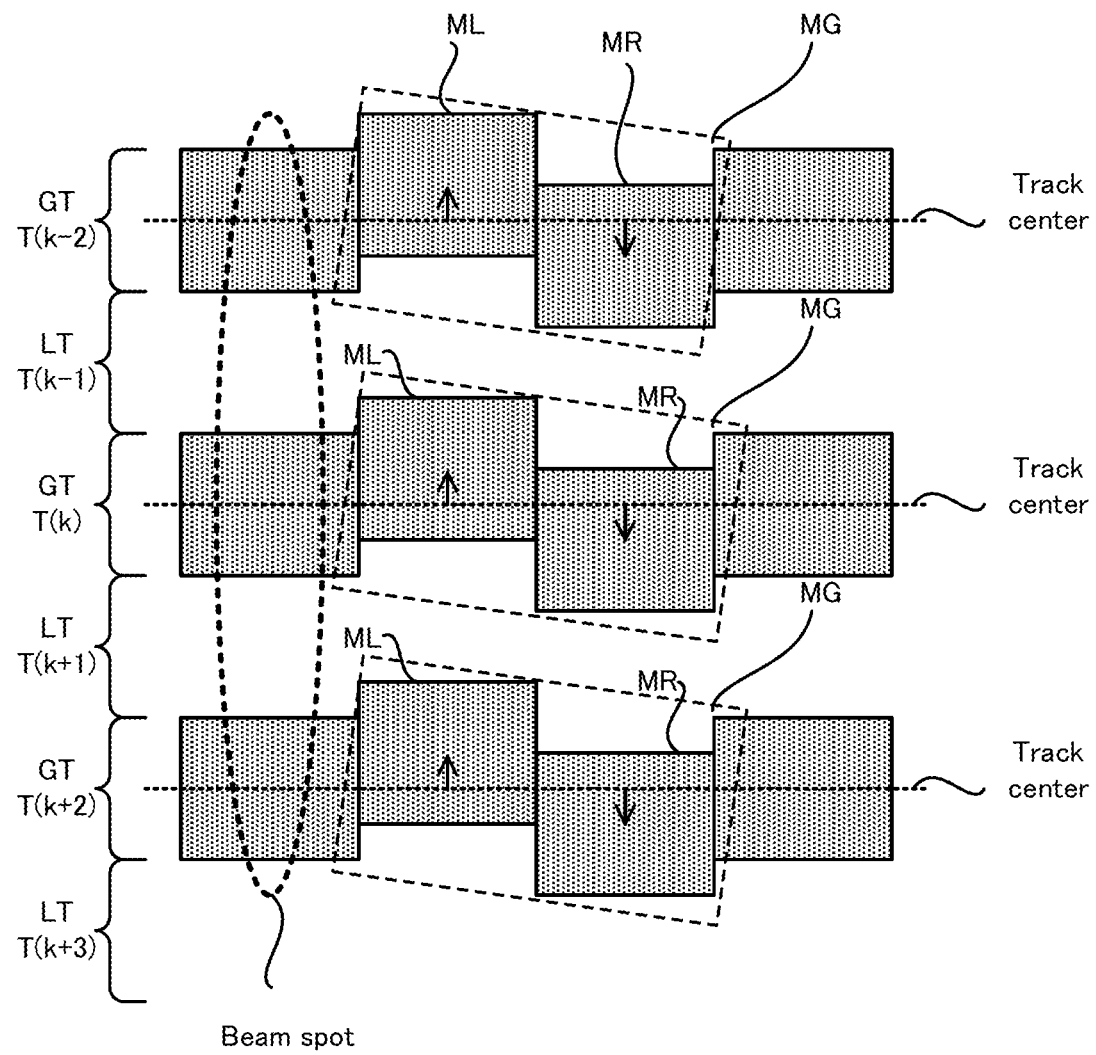
FIG. 3 is a plan view illustrating a configuration of each pair of record marks which constitutes respective one of mark groups formed on groove tracks.
Figure 4A:
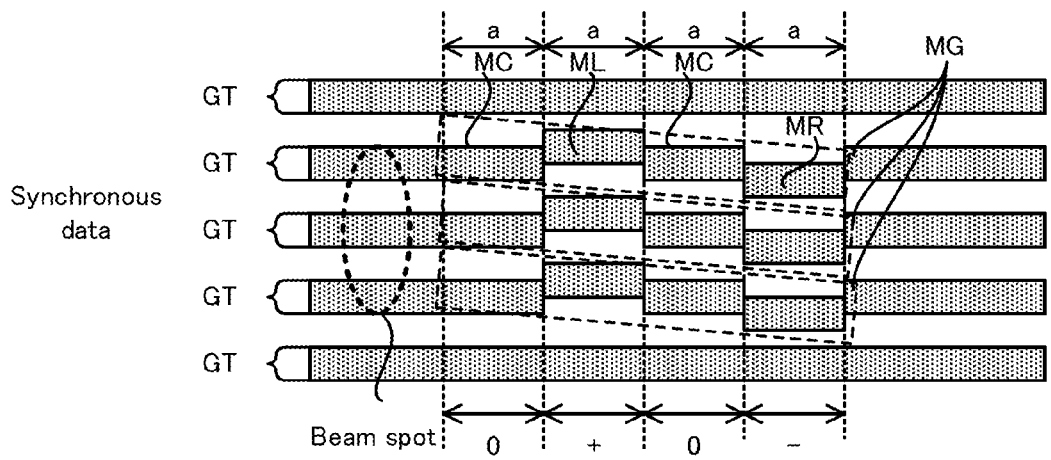
FIG. 4A to FIG. 4C are plan views illustrating aspects in which many types of data (specifically, bit data and synchronous data) are recorded by the mark groups formed on the groove tracks.
Figure 4B:
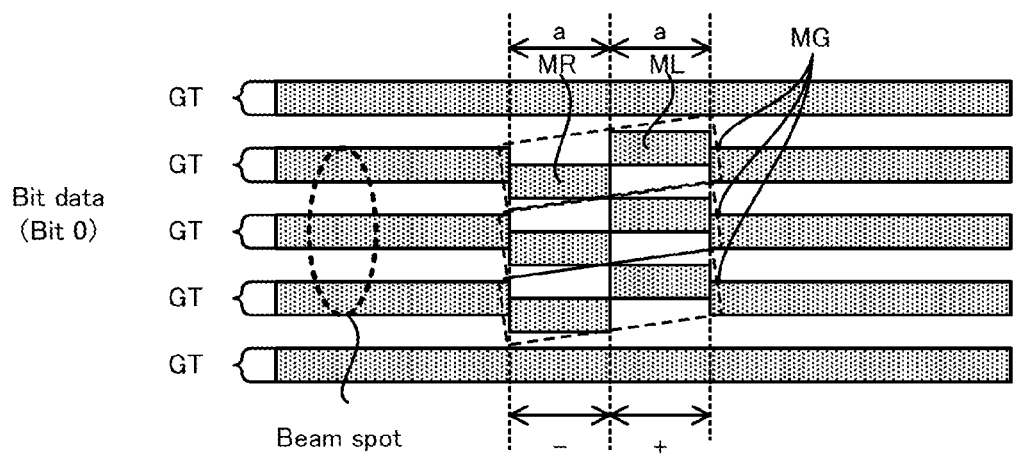
Figure 4C:
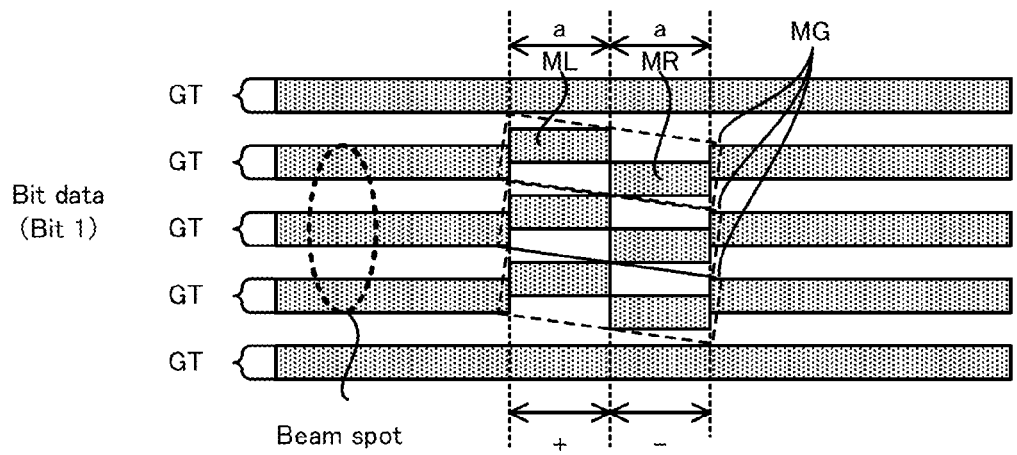

Firstly, with reference to FIG. 3 and FIG. 4A to FIG. 4C, an explanation will be given to a configuration of the mark groups MG formed on the groove tracks GT out of the mark groups MG formed on the guide layer 12. FIG. 3 is a plan view illustrating a configuration of each pair of record marks ML and MR which constitutes respective one of the mark groups MG formed on groove tracks GT. FIG. 4A to FIG. 4C are plan views illustrating aspects in which many types of data (specifically, bit data and synchronous data) are recorded by the mark groups MG formed on the groove tracks GT.

As illustrated in FIG. 3, the pair of record marks ML and MR is formed in each groove track GT, wherein the record marks ML and MR are equidistantly shifted toward the right side and the left side, respectively, from the track center of the groove track GT. More specifically, there are formed, in the groove track GT, (i) the record mark ML which is shifted by a predetermined distance to the left side from the track center of the groove track GT (e.g. to the left side with respect to the direction of travel of the groove track GT) and (ii) the record mark MR which is shifted by the predetermined distance to the right side from the track center of the groove track GT (e.g. to the right side with respect to the direction of travel of the groove track GT).

Each of the mark groups MG formed on the groove tracks GT includes the pair of record marks ML and MR as described above. For example, FIG. 3 illustrates that each of the mark groups MG formed on the groove tracks GT is a mark group MG which is exactly the pair of record marks ML and MR (i.e. which is obtained from only one pair of record marks ML and MR). As explained with reference to FIG. 4A to FIG. 4C later, however, each of the mark groups MG formed on the groove tracks GT may be (i) a mark group MG which is obtained by combining a plurality of pairs of record marks ML and MR, or (ii) a mark group MG which is obtained by combining (ii-1) one or more pairs of record marks ML and MR with (ii-2-1) one or more another record marks (e.g. another record mark MC whose center is located on the track center (refer to FIG. 4A to FIG. 4C)) or (ii-2-2) areas having no record mark formed (refer to FIG. 6A to FIG. 6C)).

In the example, the same mark group MG is formed in the same rotational phase position (i.e. in the same rotational angle position) of each of the plurality of groove tracks GT. In other words, the same mark group MG is formed on each of the plurality of groove tracks GT such that the mark groups MG are adjacent to one another or are arranged along a direction (i.e. a vertical direction in FIG. 3) perpendicular to the direction of travel of the groove tracks GT (the direction from the left to the right in FIG. 3). For example, FIG. 3 illustrates that the same mark group MG is formed in the same rotational phase position of each of three groove tracks GT (i.e. a groove track GT with a track number of "k−2", a groove track GT with a track number of "k", and a groove track GT with a track number of "k+2"), each of the mark groups MG having the record mark ML and the record mark MR arranged in this order along the direction of travel of the groove track GT.

In particular, the same mark group MG is formed in the same rotational phase position of each of the plurality of groove tracks GT which are included in the beam spot of the guide laser light LB1 (i.e. the beam spot on the guide layer 12). In other words, the number of the plurality of groove tracks GT in which the same mark group MG is formed in the same rotational phase position is equal to the number of the groove tracks GT which are included in the beam spot of the guide laser light LB1. FIG. 3 illustrates that the number of the plurality of groove tracks GT which are included in the beam spot of the guide laser light LB1 is "three". Therefore, FIG. 3 illustrates that the same mark group MG (i.e. the mark group MG in which the record mark ML and the record mark MR are arranged in this order along the direction of travel of the groove track GT) is formed in the same rotational phase position of each of the three groove tracks GT.

Incidentally, FIG. 3 illustrates the mark groups MG in each of which the record mark ML and the record mark MR are arranged in this order along the direction of travel of respective one of the groove tracks GT. However, it is also possible to use the mark groups MG in each of which the record mark MR and the record mark ML are arranged in this order along the direction of travel of the groove track GT.

Moreover, in FIG. 3, a portion which is concave in comparison with the surroundings is hatched. On the other hand, a portion which is convex in comparison with the surroundings is illustrated in blank (in white). Therefore, in the optical disc 11 in the example, the groove tracks GT are concave, the land tracks LT are convex, and the record marks ML and MR are concave. However, the groove tracks GT may be convex, the land tracks LT may be concave, and the record marks ML and MR may be convex.

In the example, the mark groups MG as described above are used to record, in the guide layer 12 (particularly, on the groove tracks GT), the control information (e.g. the clock information, the address information, the recording start timing information, etc.) in advance. More specifically, in the example, the same mark group MG formed in the same rotational phase position is used to record, in the guide layer 12, bit data which constitutes one portion of the control information in advance. Therefore, one control information may be obtained by combining (i.e. integrating) a plurality of bit data which are obtained from a plurality of different mark groups MG formed at a plurality of positions in the guide layer 12. Moreover, in the example, the mark groups MG as described above are used to record, in the guide layer 12, synchronous data for synchronization upon reading the bit data which constitutes at least one portion of the control information. However, not only the bit data which constitute at least one portion of the control information and the synchronous data but also any data may be recorded in advance in the guide layer 12 by using the mark groups MG.

Specifically, as illustrated in FIG. 4A, the mark groups MG in each of which (i) the record mark MC which is located on the track center, (ii) the record mark ML which is shifted by the predetermined distance to the left side from the track center, (iii) the record mark MC which is located on the track center, and (iv) the record mark MR which is shifted by the predetermined distance to the right side from the track center are arranged in this order along the direction of travel of the groove track GT may be formed on the groove tracks GT as the mark groups MG each of which constitutes the synchronous data. Incidentally, FIG. 4A illustrates an example in which the length of each of the record mark MC, the record mark ML and the record mark MR (specifically, the length along the direction of travel of the groove track GT) is all "a".

In this case, the signal level of a push-pull signal, which is generated from return light of the guide laser light LB1 for searching the groove tracks GT on which the mark groups MG are formed as illustrated in FIG. 4A, changes to "0", "+ (high)", "0" and "− (low)", because the guide laser light LB1 is sequentially irradiated with the record mark MC, the record mark ML, the record mark MC, and the record mark MR in this order. Incidentally, it is assumed that that a state in which the center of the beam spot of the guide laser light LB1 is shifted to the left side from the track center of the groove track GT corresponds to a state in which polarity of the push-pull signal is minus. Therefore, the synchronous data is read from the push-pull signal in which the signal level changes in order of "0", "+", "0" and "−".

As illustrated in FIG. 4B, the mark groups MG in each of which (i) the record mark MR which is shifted by the predetermined distance to the right side from the track center and (ii) the record mark ML which is shifted by the predetermined distance to the left side from the track center are arranged in this order along the direction of travel of the groove track GT may be formed on the groove tracks GT as the mark groups MG each of which constitutes the bit data (bit 0). Incidentally, FIG. 4B illustrates an example in which the length of each of the record mark ML and the record mark MR (specifically, the length along the direction of travel of the groove track GT) is all "a".

In this case, the signal level of a push-pull signal, which is generated from return light of the guide laser light LB1 for searching the groove tracks GT on which the mark groups MG are formed as illustrated in FIG. 4B, changes to "−" and "+", because the guide laser light LB1 is sequentially irradiated with the record mark MR and the record mark ML in this order. Therefore, the bit data (bit 0) is read from the push-pull signal in which the signal level changes in order of "−" and "+".

As illustrated in FIG. 4C, the mark groups MG in each of which (i) the record mark ML which is shifted by the predetermined distance to the left side from the track center and (ii) the record mark MR which is shifted by the predetermined distance to the right side from the track center are arranged in this order along the direction of travel of the groove track GT may be formed on the groove tracks GT as the mark groups MG each of which constitutes the bit data (bit 1). Incidentally, FIG. 4C illustrates an example in which the length of each of the record mark ML and the record mark MR (specifically, the length along the direction of travel of the groove track GT) is all "a".

In this case, the signal level of a push-pull signal, which is generated from return light of the guide laser light LB1 for searching the groove tracks GT on which the mark groups MG are formed as illustrated in FIG. 4C, changes to "+" and "−", because the guide laser light LB1 is sequentially irradiated with the record mark ML and the record mark MR in this order. Therefore, the bit data (bit 1) is read from the push-pull signal in which the signal level changes in order of "+" and "−".

Incidentally, the aspects of the mark groups MG illustrated in FIG. 4 (i.e. the mark group MG which constitutes the synchronous data, the mark group MG which constitutes the bit data (bit 0) and the mark group MG which constitutes the bit data (bit 1)) are merely one example. Therefore, three types of mark groups MG indicating aspects other than those illustrated in FIG. 4 may be used to constitute the synchronous data, the bit data (bit 0), and the bit data (bit 1).

(2-2) Configuration of Mark Groups Formed on Land Tracks

Figure 5:
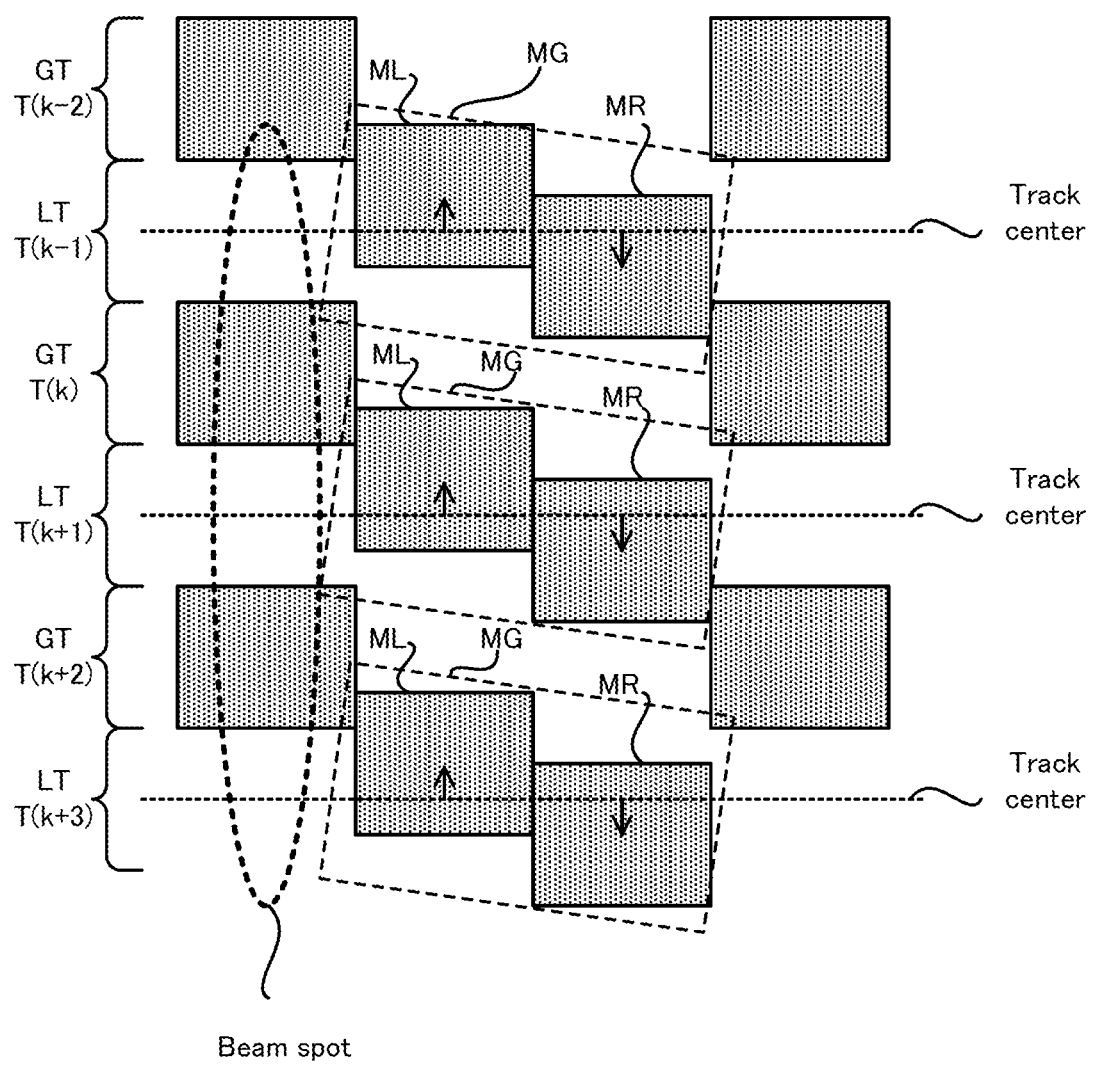
FIG. 5 is a plan view illustrating a configuration of each pair of record marks which constitutes respective one of mark groups formed on land tracks.
Figure 6A:
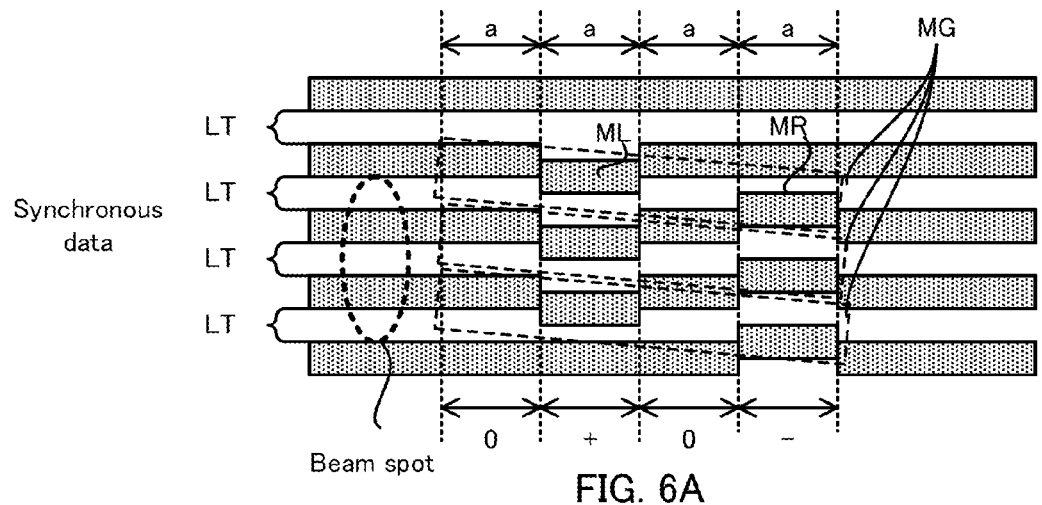
FIG. 6A to FIG. 6C are plan views illustrating aspects in which many types of data (specifically, bit data and synchronous data) are recorded by the mark groups formed on the land tracks.
Figure 6B:
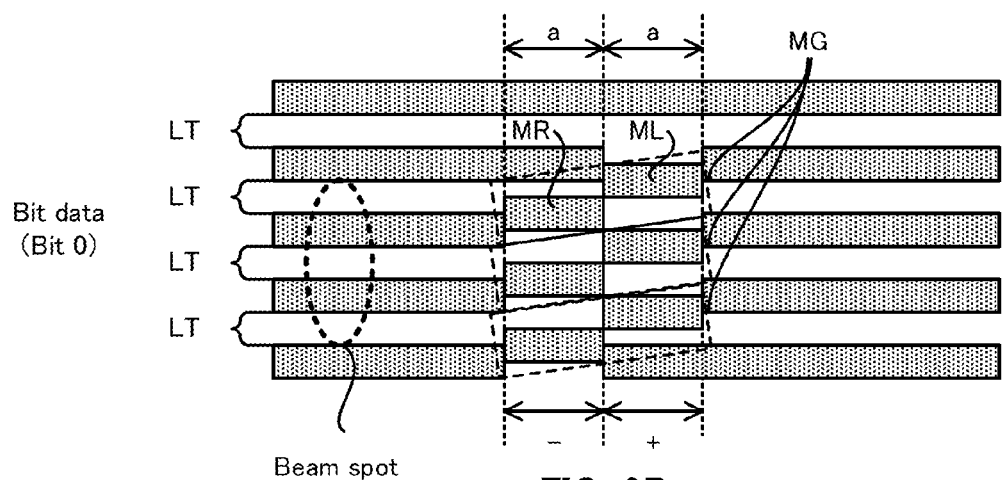
Figure 6C:
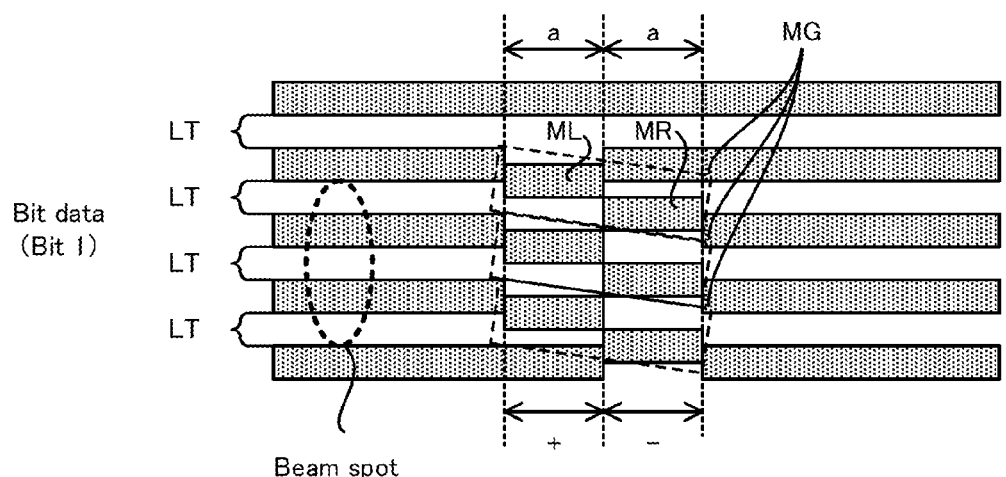

Next, with reference to FIG. 5 and FIG. 6A to FIG. 6C, an explanation will be given to a configuration of the mark groups MG formed on the land tracks LT out of the mark groups MG formed on the guide layer 12. FIG. 5 is a plan view illustrating a configuration of each pair of record marks ML and MR which constitutes respective one of the mark groups MG formed on land tracks LT. FIG. 6A to FIG. 6C are plan views illustrating aspects in which many types of data (specifically, bit data and synchronous data) are recorded by the mark groups MG formed on the land tracks LT.

As illustrated in FIG. 5, the pair of record marks ML and MR is formed in each land track LT, wherein the record marks ML and MR are equidistantly shifted toward the right side and the left side, respectively, from the track center of the land track LT. More specifically, there are formed, in the land track LT, (i) the record mark ML shifted by the predetermined distance to the left side from the track center of the land track LT (e.g. to the left side with respect to the direction of travel of the land track LT) and (ii) the record mark MR which is shifted by the predetermined distance to the right side from the track center of the land track LT (e.g. to the right side with respect to the direction of travel of the land track LT).

Each of the mark groups MG formed on the land tracks LT includes the pair of record marks ML and MR as described above. For example, FIG. 5 illustrates that each of the mark groups MG formed on the land tracks LT is a mark group MG which is exactly the pair of record marks ML and MR (i.e. which is obtained from only one pair of record marks ML and MR). As explained with reference to FIG. 6A to FIG. 6C later, however, each of the mark groups MG formed on the land tracks LT may be (i) a mark group MG which is obtained by combining a plurality of pairs of record marks ML and MR, or (ii) a mark group MG which is obtained by combining (ii-1) one or more pairs of record marks ML and MR with (ii-2-1) one or more another record marks (e.g. another record mark MC whose center is located on the track center (refer to FIG. 4A to FIG. 4C)) or (ii-2-2) areas having no record mark formed (refer to FIG. 6A to FIG. 6C)).

In the example, the same mark group MG is formed in the same rotational phase position (i.e. in the same rotational angle position) of each of the plurality of land tracks LT. In other words, the same mark group MG is formed on each of the plurality of land tracks LT such that the mark groups MG are adjacent to one another or are arranged along a direction (i.e. a vertical direction in FIG. 5) perpendicular to the direction of travel of each of the land tracks LT (the direction from the left to the right in FIG. 5). For example, FIG. 5 illustrates that the same mark group MG is formed in the same rotational phase position of each of three land tracks LT (i.e. a land track LT with a track number of "k−1", a land track LT with a track number of "k+1", and a land track LT with a track number of "k+3"), each of the mark groups MG having the record mark ML and the record mark MR arranged in this order along the direction of travel of the land track LT.

In particular, the same mark group MG is formed in the same rotational phase position of each of the plurality of land tracks LT which are included in the beam spot of the guide laser light LB1 (i.e. the beam spot on the guide layer 12). In other words, the number of the plurality of land tracks LT in which the same mark group MG is formed in the same rotational phase position is equal to the number of the land tracks LT which are included in the beam spot of the guide laser light LB1. FIG. 5 illustrates that the number of the plurality of land tracks LT which are included in the beam spot of the guide laser light LB1 is "three". Therefore, FIG. 5 illustrates that the same mark group MG (i.e. the mark group MG in which the record mark ML and the record mark MR are arranged in this order along the direction of travel of the land track LT) is formed in the same rotational phase position of each of the three land tracks LT.

Incidentally, FIG. 5 illustrates the mark groups MG in each of which the record mark ML and the record mark MR are arranged in this order along the direction of travel of respective one of the land tracks LT. However, it is also possible to use the mark groups MG in each of which the record mark MR and the record mark ML are arranged in this order along the direction of travel of the land track LT.

In the example, the mark groups MG as described above are used to record, in the guide layer 12 (particularly, on the land tracks LT), the control information (e.g. the clock information, the address information, the recording start timing information, etc.) in advance. More specifically, in the example, the same mark group MG formed in the same rotational phase position is used to record, in the guide layer 12, the bit data which constitutes one portion of the control information in advance. Therefore, one control information is obtained by combining (i.e. integrating) a plurality of bit data which are obtained from a plurality of different mark groups MG formed at a plurality of positions in the guide layer 12. Moreover, in the example, the mark groups MG as described above are used to record, in the guide layer 12, the synchronous data for synchronization upon reading the bit data which constitutes at least one portion of the control information. However, not only the bit data which constitute at least one portion of the control information and the synchronous data but also any data may be recorded in advance in the guide layer 12 by using the mark groups MG.

Specifically, as illustrated in FIG. 6A, the mark groups MG in each of which (i) the area having no record mark formed, (ii) the record mark ML which is shifted by the predetermined distance to the left side from the track center, (iii) the area having no record mark formed, and (iv) the record mark MR which is shifted by the predetermined distance to the right side from the track center are arranged in this order along the direction of travel of the land track LT may be formed on the land tracks LT as the mark groups MG each of which constitutes the synchronous data. Incidentally, FIG. 6A illustrates an example in which the length of each of the area having no record mark formed, the record mark ML and the record mark MR (specifically, the length along the direction of travel of the groove track GT) is all "a".

In this case, the signal level of a push-pull signal, which is generated from return light of the guide laser light LB1 for searching the land tracks LT on which the mark groups MG are formed as illustrated in FIG. 6A, changes to "0", "+", "0" and "−", because the guide laser light LB1 is sequentially irradiated with the area having no record mark formed, the record mark ML, the area having no record mark formed, and the record mark MR in this order. Therefore, the synchronous data is read from the push-pull signal in which the signal level changes in order of "0", "+", "0" and "−".

As illustrated in FIG. 6B, the mark groups MG in each of which (i) the record mark MR which is shifted by the predetermined distance to the right side from the track center and (ii) the record mark ML which is shifted by the predetermined distance to the left side from the track center are arranged in this order along the direction of travel of the land track LT may be formed on the land tracks LT as the mark groups MG each of which constitutes the bit data (bit 0). Incidentally, FIG. 6B illustrates an example in which the length of each of the record mark ML and the record mark MR (specifically, the length along the direction of travel of the land track LT) is all "a".

In this case, the signal level of a push-pull signal, which is generated from return light of the guide laser light LB1 for searching the land tracks LT on which the mark groups MG are formed as illustrated in FIG. 6B, changes to "−" and "+", because the guide laser light LB1 is sequentially irradiated with the record mark MR and the record mark ML in this order. Therefore, the bit data (bit 0) is read from the push-pull signal in which the signal level changes in order of "−" and "+".

As illustrated in FIG. 6C, the mark groups MG in each of which (i) the record mark ML which is shifted by the predetermined distance to the left side from the track center and (ii) the record mark MR which is shifted by the predetermined distance to the right side from the track center are arranged in this order along the direction of travel of the land tracks LT may be formed on the land tracks LT as the mark groups MG each of which constitutes the bit data (bit 1). Incidentally, FIG. 6C illustrates an example in which the length of each of the record mark ML and the record mark MR (specifically, the length along the direction of travel of the groove track GT) is all "a".

In this case, the signal level of a push-pull signal, which is generated from return light of the guide laser light LB1 for searching the land tracks LT on which the mark groups MG are formed as illustrated in FIG. 6C, changes to "+" and "−", because the guide laser light LB1 is sequentially irradiated with the record mark ML and the record mark MR in this order. Therefore, the bit data indicative of bit 1 is read from the push-pull signal in which the signal level changes in order of "+" and "−".

Incidentally, the aspects of the mark groups MG illustrated in FIG. 6 (i.e. the mark group MG which constitutes the synchronous data, the mark group MG which constitutes the bit data (bit 0) and the mark group MG which constitutes the bit data (bit 1)) are merely one example. Therefore, three types of mark groups MG indicating aspects other than those illustrated in FIG. 6 may be used to constitute the synchronous data, the bit data (bit 0), and the bit data (bit 1).

The mark groups MG formed on the land tracks LT as described above are preferably formed simultaneously with the formation of the groove tracks GT, at the time of manufacture of the optical disc 11. The groove tracks GT and the record marks MR and ML are concave, and thus, cutting process using cutting laser light is performed on positions corresponding to the groove tracks GT and the mark groups MG, at the time of manufacture of the optical disc 11. In other words, the cutting laser light is irradiated on the positions corresponding to the groove tracks GT, the positions corresponding to the record marks MR, and the positions corresponding to the record marks ML. On the other hand, the land tracks LT are convex, and thus, the cutting process using the cutting laser light does not have to be performed on positions corresponding to the land tracks LT, at the time of manufacture of the optical disc 11. In other words, the cutting laser light does not have to be irradiated on the positions corresponding to the land tracks LT. Thus, if the mark groups MG formed on the land tracks LT are formed simultaneously with the formation of the groove tracks GT, the cutting laser light does not have to be irradiated at all at the time of formation of the land tracks LT (in other words, it is only necessary to turn on or off the cutting laser light at the time of formation of the groove tracks GT). Therefore, a manufacturing process of the optical disc 11 is simplified.

(2-3) Aspect of Distribution of Mark Groups

Figure 7:
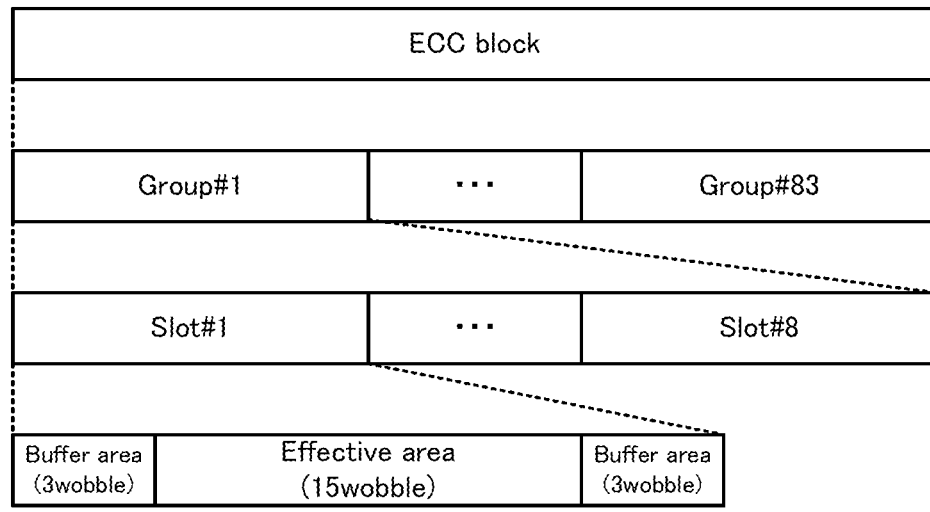
FIG. 7 is a data structure diagram illustrating a data structure of the guide layer (and further, recording layers)
Figure 8:
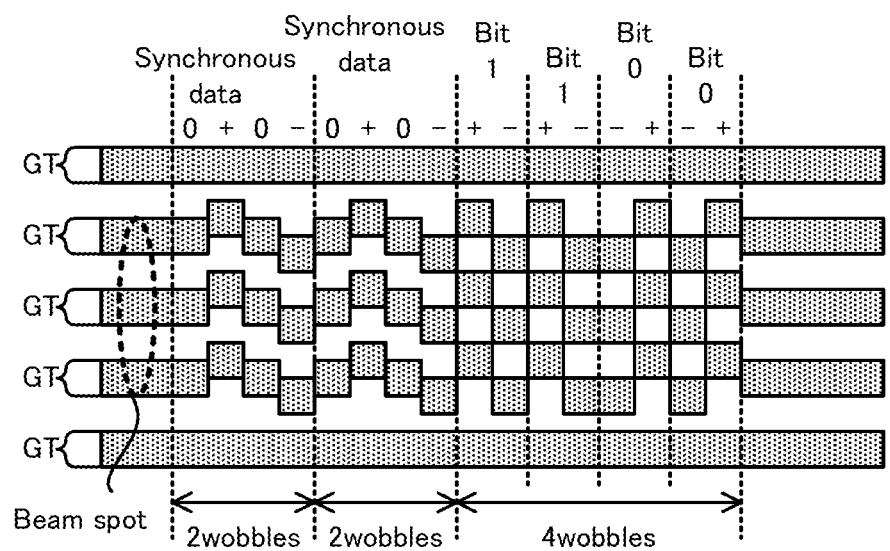
FIG. 8 is a plan view illustrating one example of the mark groups formed in particular slots.
Figure 9:
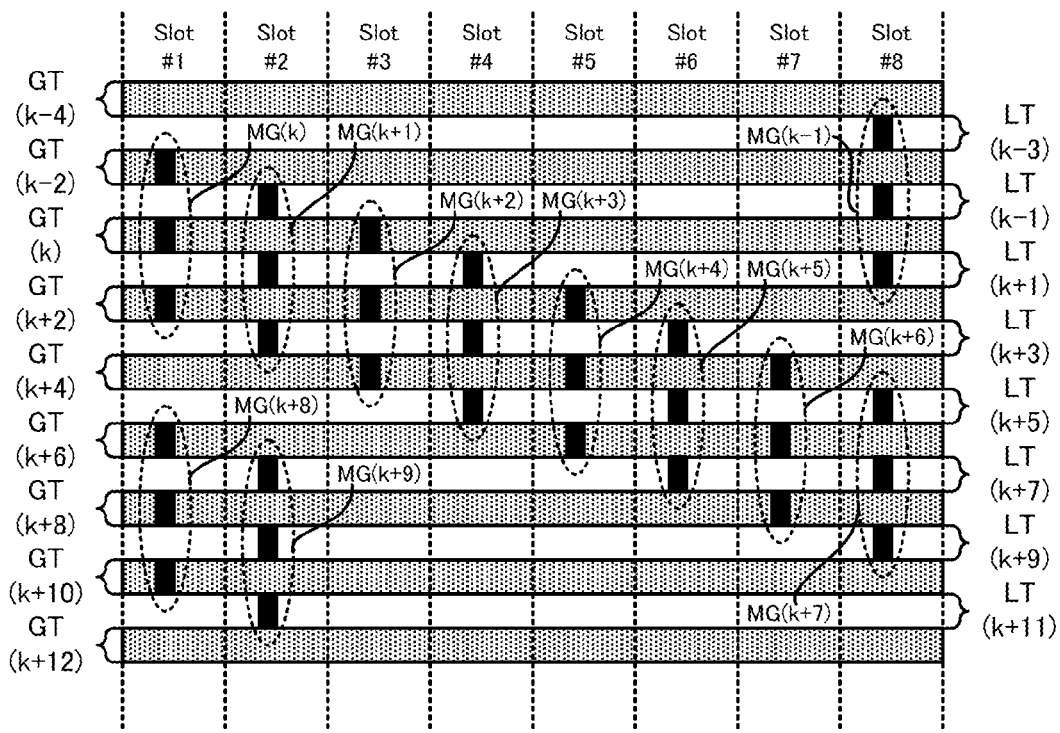
FIG. 9 is a plan view illustrating an aspect in which a plurality of mark groups are distributed and recorded in a plurality of slots.

Next, with reference to FIG. 7 to FIG. 9, an aspect of a distribution of the mark groups MG formed on the guide layer 12 will be explained. FIG. 7 is a data structure diagram illustrating a data structure of the guide layer 12 (and further, recording layers 13). FIG. 8 is a plan view illustrating one example of the mark groups formed in particular slots. FIG. 9 is a plan view illustrating an aspect in which a plurality of mark groups are distributed and recorded in a plurality of slots.

As illustrated in FIG. 7, each of the recording layers 13 is divided by a unit of ECC block. In other words, the record information recorded on the recording layer 13 is recorded by the unit of ECC block. Thus, as in the recording layers 13, the guide layer 12 is also divided by the unit of ECC block. In other words, the control information (e.g. the address information, the clock information, the recording start timing information, etc.) recorded on the guide layer 12 is recorded by the unit of ECC block.

One ECC block is subdivided into 83 groups. One group is subdivided into eight slots. One slot has a size corresponding to 21 wobbles. Out of the 21 wobbles, each of three wobbles corresponding to a header and three wobbles corresponding to a footer corresponds to a buffer area for preventing interference with adjacent slots. Therefore, one slot can substantially record therein information with a size corresponding to at most 15 wobbles.

As illustrated in FIG. 8, each of mark groups MG which indicates two synchronous data and four bit data is formed using eight wobbles out of the 15 wobbles. In other words, in the example illustrated in FIG. 8, 4-bit bit data can be recorded in one slot. If it is allowed to use all the 15 wobbles for the recording of the bit data, a mark group MG indicating two synchronous data and 11 bit data can be formed in one slot.

As illustrated in FIG. 9, in the example, the unit of the slot as described above is used to record different mark groups MG such that the different mark groups MG are not repeatedly formed in the same rotational phase position of the same group track GT or the same land track LT. Hereinafter, the mark group(s) MG which is(are) formed in the same rotational phase positions of the respective plurality of guide tracks TR whose center is the guide track TR with a track number of "k" are referred to a mark group(s) MG(k).

As illustrated in FIG. 9, it is assumed that the mark groups MG(k) are formed in a slot #1. In this case, the mark group MG(k) is formed not only on the groove track GT with a track number of "k" but also on the groove track GT with a track number of "k−2" and the groove track GT with a track number of "k+2" in the same manner. Therefore, other mark groups MG other than the mark groups MG(k) are not formed in the position of the slot #1 on the guide tracks TR which are from the groove track GT with a track number of "k−2" to the groove track GT with a track number of "k+2". By this, the mark groups MG(k) and the other mark groups MG other than the mark groups MG(k) are not repeatedly formed in the same rotational phase position on the same guide track TR.

On the other hand, the other mark groups MG other than the mark groups MG(k) may be formed in slots other than the slot #1, even on the guide tracks TR which are from the groove track with a track number of "k−2" to the groove track GT with a track number of "k+2". In other words, in the example, the certain mark groups MG(k) and the other mark groups MG (e.g. a mark groups MG(k−4) to a mark groups MG(k−1), and a mark groups MG(k+1) to a mark groups MG(k+4)) formed on the same guide track TR as the guide track TR on which the mark groups MG(k) are formed are preferably formed in different slots. By this, the mark groups MG(k) and the other mark groups MG other than the mark groups MG(k) are not repeatedly formed in the same rotational phase position on the same guide track TR.

For example, FIG. 9 illustrates that a MG(k−1) is formed in the position of a slot #8 on each of a land track LT with a track number of "k−3", the land track LT with a track number of "k−1", and the land track LT with a track number of "k+1". In the same manner, for example, FIG. 9 illustrates that a MG(k+1) is formed in the position of a slot #2 on each of the land track LT with a track number of "k−1", the land track LT with a track number of "k+1", and a land track LT with a track number of "k+3". In the same manner, for example, FIG. 9 illustrates that a MG(k+2) is formed in the position of a slot #3 on each of the groove track GT with a track number of "k", the groove track GT with a track number of "k+2", and a groove track GT with a track number of "k+4". In the same manner, for example, FIG. 9 illustrates that a MG(k+3) is formed in the position of a slot #4 on each of the land track LT with a track number of "k+1", the land track LT with a track number of "k+3", and a land track LT with a track number of "k+5". In the same manner, for example, FIG. 9 illustrates that a MG(k+4) is formed in the position of a slot #5 on the groove track GT with a track number of "k+2", the groove track GT with a track number of "k+4", and a groove track GT with a track number of "k+6". As described above, by distinguishing rotational radius positions, in which the mark groups MG are formed, by a unit of the slot, the mark groups MG(k−1) to the mark groups MG(k+4), whose record marks are formed on at least one of the guide tracks TR which are from the groove track GT with a track number of "k−2" to the groove track GT with a track number of "k+2", are not formed in a mutually overlap position (i.e. in the same rotational radius position).

Incidentally, shift amounts (shift quantity) of the record marks ML and MR from the respective track centers may be unified in all the mark groups MG, or may be different in each mark group MG. For example, in the example illustrated in FIG. 9, the shift amounts of the record marks ML and MR, which constitute the mark groups MG(k), from the respective track centers may be the same as or different from shift amounts of the record marks ML and MR, which constitute the other mark groups MG, from the respective track centers. In short, it is enough to unify the shift amounts of the record marks ML and MR, which constitute the same mark groups MG, from the respective track centers, in the same mark groups MG. For example, it is enough to unify the shift amounts of the record mark ML and MR, which constitute the same mark group MG(k), from the respective track centers, at least in the same mark group MG(k).

(2-4) Characteristics of Mark Groups

Next, the characteristics of the mark groups MG in the example will be explained.

Firstly, as described above, regardless of the presence/absence of the mark groups MG, the push-pull signal according to a positional relation between the center of the beam spot of the guide laser light LB1 and the track centers of the guide tracks TR is obtained from the return light of the guide laser light LB1 for searching the guide tracks TR. As a result, tracking control based on the push-pull signal is performed.

On the other hand, the signal level of the push-pull signal, which is obtained from the return light of the guide laser light LB1 for searching the guide tracks TR on which the mark groups MG are formed, varies depending on the pattern of the record marks ML and MR which constitute the mark groups MG (refer to FIG. 4A to FIG. 4C, and FIG. 6A to FIG. 6C). In other words, in the example, the signal level of the push-pull signal varies depending on the positional relation between the center of the beam spot of the guide laser light LB1 and the record marks which constitute the mark groups MG. However, each of the mark groups MG is made of the pair of record marks ML and MR which are equidistantly shifted toward the right side and the left side, respectively, from the track center, and thus, an average value (i.e. an integrated value) of the variation in the signal level of the push-pull signal is zero. Therefore, even if the mark groups MG are formed on the guide tracks TR, the mark groups MG hardly have or do not have a significant adverse influence on the tracking control based on the push-pull signal (e.g. an adverse influence by which the normal tracking control cannot be performed). Therefore, even if the mark groups MG are formed on the guide tracks TR, the tracking control is preferably performed, substantially as in cases where the mark groups MG are not formed on the guide tracks TR.

In addition, as descried above, various data (e.g. the synchronous data and the bit data described above) is read from the variation in the signal level of the push-pull signal. In other words, in the example, by forming on the guide layer 12 the mark groups MG each of which includes the pair of record marks ML and MR, it is possible to record the various data by using the push-pull signal. That is, in the example, by forming on the guide layer 12 the mark groups MG each of which includes the pair of record marks ML and MR, it is possible to record into the guide layer 12 the various data that does not have to be read by using an RF signal.

Figure 10:
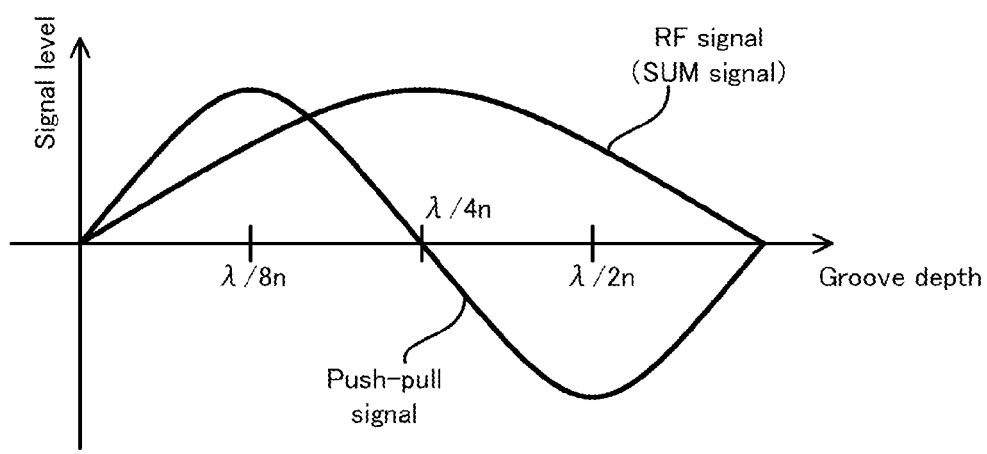
FIG. 10 is a graph illustrating a relation between a depth of concave portions of the groove tracks (i.e. a relative depth of the groove tracks with respect to the land tracks) and a signal level of a push-pull signal, and a relation between the depth and a signal level of a RF signal.

Now, with reference to FIG. 10, an explanation will be given to an advantage realized by that information indicated by the mark groups MG formed on the guide layer 12 is read from the push-pull signal used for the tracking control. FIG. 10 is a graph illustrating a relation between a depth of concave portions of the groove tracks GT (i.e. a relative depth of the groove tracks GT with respect to the land tracks LT) and the signal level of the push-pull signal, and a relation between the depth and a signal level of an RF signal.

As illustrated in FIG. 10, the signal level of the push-pull signal which is used for the tracking control is the best when the depth of the groove tracks GT is $\lambda/8n$ (i.e. $\lambda \div (8 \times n)$). On the other hand, the signal level of the RF signal which is not used for the tracking control is the best when the depth of the groove tracks GT is $\lambda/4n$ (i.e. $\lambda \div (4 \times n)$). If control information which needs to be read by using the RF signal is recorded, it is necessary to consider not only the signal level (i.e. signal characteristics) of the push-pull signal but also the signal level (i.e. signal characteristics) of the RF signal.

In the example, however, the control information which can be read by using the push-pull signal, which is originally used for the tracking control, is recorded on the guide layer 12. Therefore, it is enough to consider the signal level (i.e. signal characteristics) of the push-pull signal. In other words, it is not necessary to consider the signal level (i.e. signal characteristics) of the RF signal.

Thus, in the example, the depth of the groove tracks GT (moreover, the depth of the record marks ML and MR) may be set to be less than $\lambda/6n$. This provides preferable signal characteristics of the push-pull signal, and thus, the tracking control is preferably performed, and the control information recorded in the guide layer 12 by using the mark groups MG is preferably read.

Alternatively, the depth of the groove tracks GT (moreover, the depth of the record marks ML and MR) may be set to be less than $\lambda/8n$. This provides the best signal characteristics of the push-pull signal, and thus, the tracking control is more preferably performed, and the control information recorded in the guide layer 12 by using the mark groups MG is more preferably read.

Figure 11:
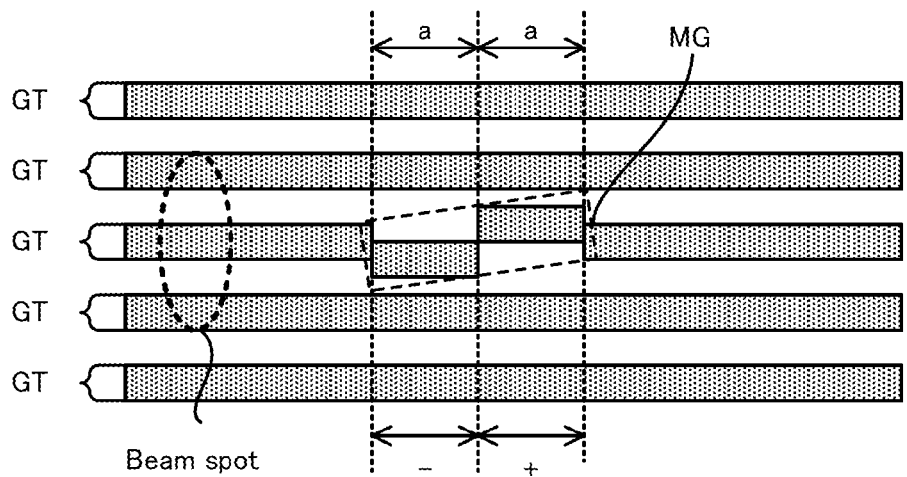
FIG. 11 is a plan view illustrating a comparative example in which the mark group is formed on a single groove track.
Figure 12:
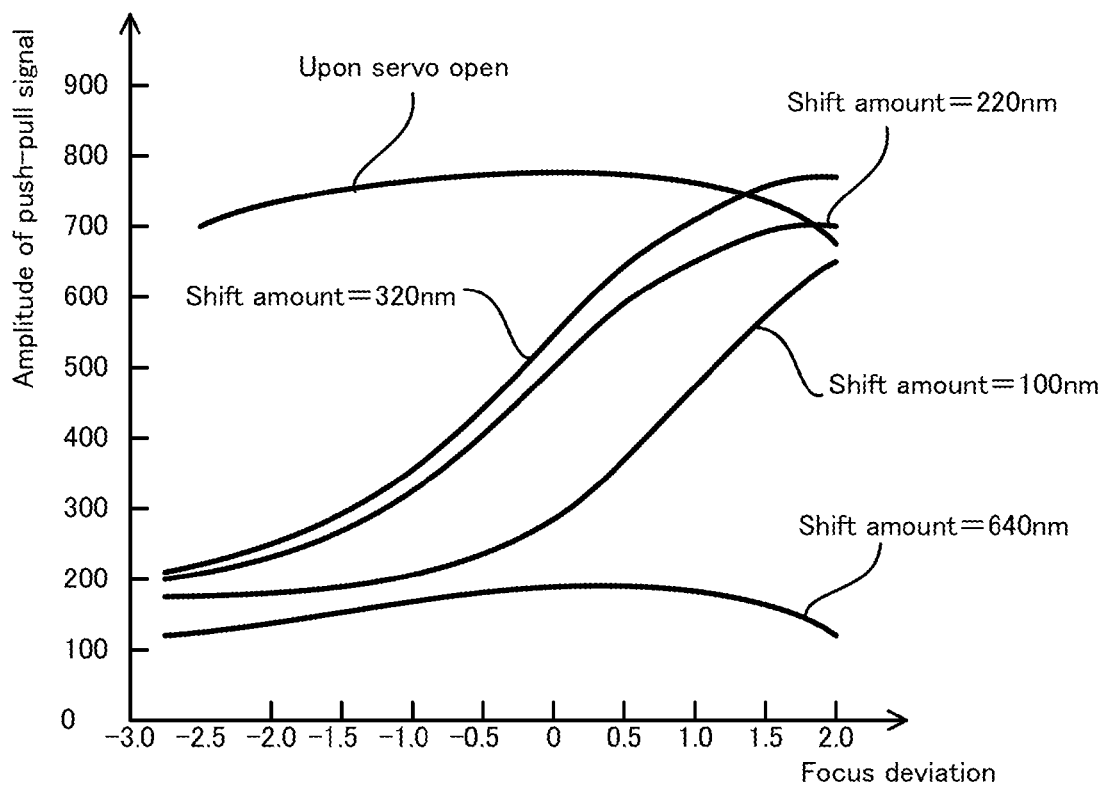
FIG. 12 is a graph illustrating a relation between a focus deviation and the amplitude of the push-pull signal.
Figure 13A:
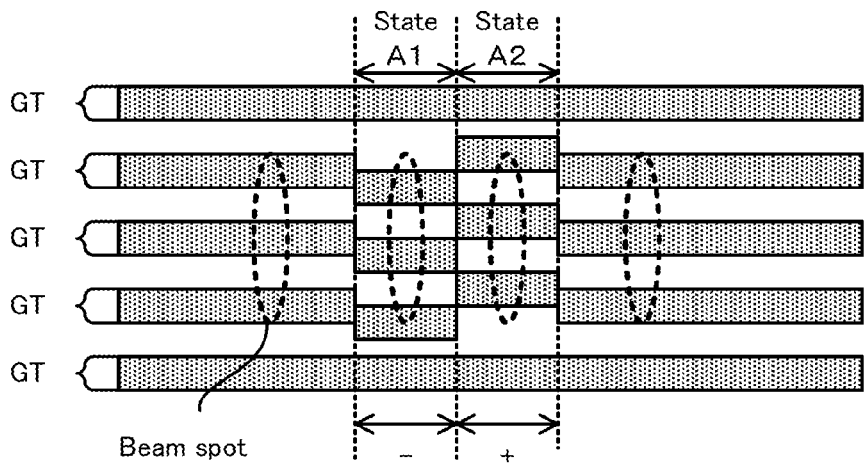
FIG. 13A to FIG. 13C are plan views illustrating a positional relation among a pair of record marks, the groove track(s), and a beam spot of the guide laser light in the guide layer.
Figure 13B:
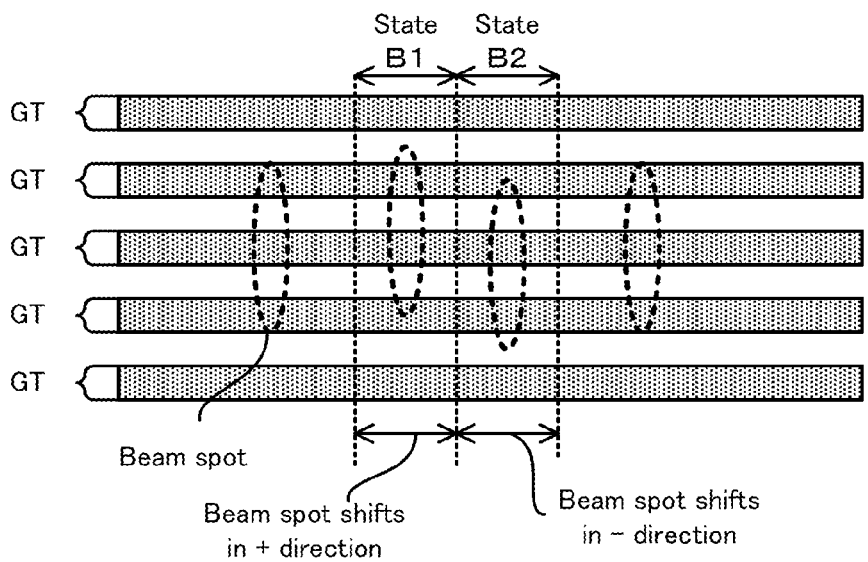
Figure 13C:
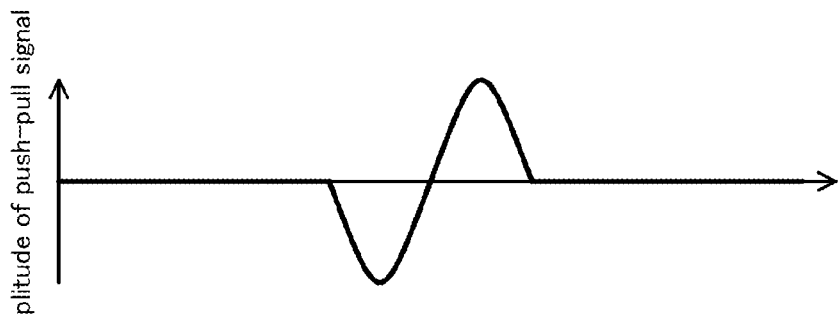

In addition, in the example, the same mark group MG is formed in the same rotational phase position of each of the plurality of groove tracks GT. In the same manner, in the example, the same mark group MG is formed in the same rotational phase position of each of the plurality of land tracks LT. Thus, it is possible to reduce a dependence on a focus deviation (focus offset) of the guide laser light LB1 (specifically, to preferably read the control information indicated by the mark groups MG even if the focus deviation is increased). Hereinafter, with reference to FIG. 11 to FIG. 13A and FIG. 13B, an explanation will be given to an effect of reducing the dependence on the focus deviation. FIG. 11 is a plan view illustrating a comparative example in which the mark group is formed on a single groove track. FIG. 12 is a graph illustrating a relation between the focus deviation and the amplitude of the push-pull signal. FIG. 13A and FIG. 13B are plan views illustrating a positional relation among the pair of record marks ML and MR, the groove track(s) GT, and the beam spot of the guide laser light LB1 in the guide layer 12.

As illustrated in FIG. 11, it is assumed that the mark group MG is formed on a single groove track GT. At this time, the amplitudes of the push-pull signals are as illustrated in FIG. 12, in the case where the shift amount of the pair of the record mark ML and MR, which constitute the mark group, from the track center is set to four types of 100 nm, 200 nm, 320 nm and 640 nm. As is clear from FIG. 12, in the comparative example in which the mark group MG is formed on the single groove track GT, as the focus deviation increases (e.g. increases in a negative direction in FIG. 12), the amplitude of the push-pull signal decreases. As a result, there is a possibility that the tracking control is not preferably performed, and that the control information recorded in the guide layer 12 using the mark group MG cannot be preferably read. This is supposedly because only one mark group MG cannot be preferably read if the degree of defocus becomes stronger in accordance with an increasing focus change.

On the other and, according to the example, the same mark group MG is formed in the same rotational phase position of each of the plurality of groove tracks GT (or the plurality of land tracks LT), and thus, the amplitude of the push-pull signal is substantially the same as the amplitude of the push-pull signal which is obtained in a tracking servo open state. In other words, the dependence on the focus deviation of the amplitude of the push-pull signal in the example is substantially the same as the dependence on the focus deviation of the amplitude of the push-pull signal in the tracking servo open state. Thus, in the example, the tracking control is preferably performed, and the control information recorded in the guide layer 12 using the mark groups MG is preferably read.

Here, the state of the beam spot of the guide laser light LB1 when searching for the record marks MR which is shifted to the right side from the track center (refer to a state A1 in FIG. 13A) is substantially the same as the state of the beam spot of the guide laser light LB1 which is shifted to the left side (shifted by about 270 degrees in phase) from the track center in the tracking servo open state (refer to a state B1 in FIG. 13B). In the same manner, the state of the beam spot of the guide laser light LB1 when searching for the record marks ML which is shifted to the left side from the track center (refer to a state A2 in FIG. 13A) is substantially the same as the state of the beam spot of the guide laser light LB1 which is shifted to the right side (shifted by about 90 degrees in phase) from the track center in the tracking servo open state (refer to a state B2 in FIG. 13B). Therefore, the waveform of the push-pull signal obtained from the guide laser light LB1 in the state illustrated in FIG. 13A is substantially the same as the waveform of the push-pull signal obtained from the guide laser light LB1 illustrated in FIG. 13B (refer to FIG. 13C). Thus, as described above, the dependence on the focus deviation of the amplitude of the push-pull signal in the example is substantially the same as the dependence on the focus deviation of the amplitude of the push-pull signal in the tracking servo open state.

Incidentally, in each of the technologies or techniques disclosed in the aforementioned patent document 2 to 6, in order to record single data onto the single record track, record pits or wobbles which is formed on the single record track are merely shifted from side to side as illustrated in FIG. 11. In other words, the technologies or techniques disclosed in the aforementioned patent document 2 to 6 are different from the example, because the same data is not recorded in the same rotational phase position of the plurality of record tracks (in other words, in that pits or wobbles indicating the same data are not formed) in the technologies or techniques disclosed in the aforementioned patent document 2 to 6.

In addition, according to the example, the mark groups MG are formed on both the groove tracks GT and the land tracks LT. Thus, in comparison with an optical disc in which the mark groups MG are formed only on either the groove tracks GT or the land track LT, it is possible to increase the size of the control information which can be recorded in the guide layer 12. This further facilitates the reading of the control information recorded in the guide layer 12, in comparison with the optical disc in which the mark groups MG are formed only on either the groove tracks GT or the land track LT.

Figure 14A:
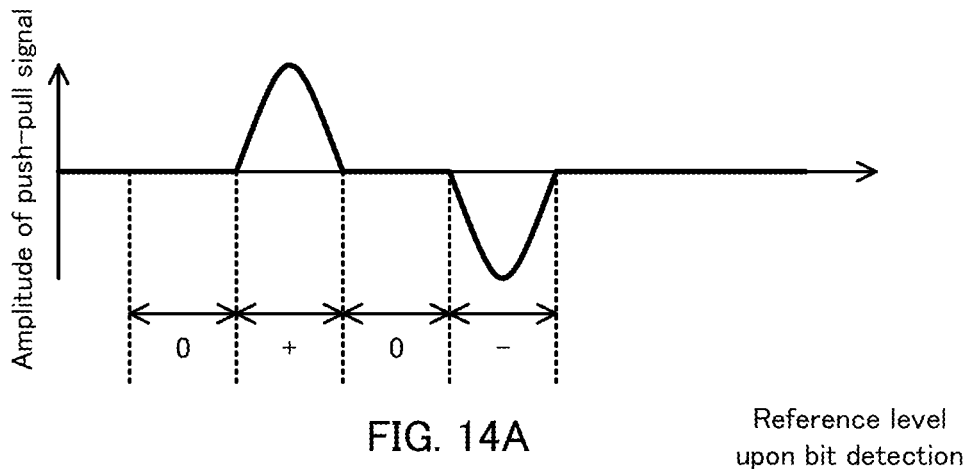
FIG. 14A and FIG. 14B are graphs illustrating the push-pull signal obtained from the mark group which constitutes the synchronous data and which includes a pair of record marks and a record mark located on a track center.
Figure 14B:
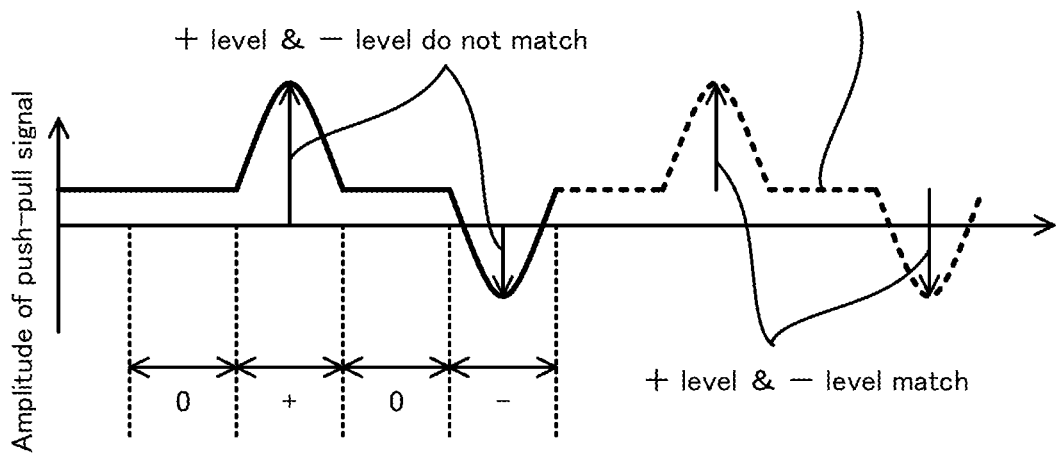

In addition, according to the example, the mark group MG which constitutes the synchronous data includes the record mark MC located on the track center in addition to the pair of record marks ML and MR. In this case, even if a reference value of the signal level of the push-pull signal (e.g. zero level) varies, the variation in the signal level of the push-pull signal according to the pair of record marks ML and MR can be preferably recognized. Hereinafter, with reference to FIG. 14A and FIG. 14B, an explanation will be given to the advantage that the variation in the signal level of the push-pull signal according to the pair of record marks ML and MR can be preferably recognized even if the reference value of the signal level of the push-pull signal varies. FIG. 14A and FIG. 14B are graphs illustrating the push-pull signal obtained from the mark group MG which constitutes the synchronous data, and which includes the pair of record marks ML and MR and the record mark MC located on the track center.

As illustrated in FIG. 14A, if the reference value of the signal level of the push-pull signal does not vary, the variation in the signal level of the push-pull signal according to the pair of record marks ML and MR are preferably recognized by using a so-called default zero level.

On the other hand, as illustrated by a solid line on the left side of FIG. 14B, if the reference value of the signal level of the push-pull signal varies (e.g. is shifted in the positive direction), by using the so-called default zero level makes the signal level of the push-pull signal according to the record mark ML may be different from the signal level of the push-pull signal according to the record mark MR. This may result in a reduction in reliability of the reading of the record marks ML and MR based on the push-pull signal.

In the example, however, as illustrated by a dashed line on the right side of FIG. 14B, it is possible to adjust the reference value of the signal level of the push-pull signal by using the signal level of the push-pull signal according to the record mark MC located on the track center. Therefore, even if the reference value of the signal level of the push-pull signal (e.g. zero level) varies, the variation in the signal level of the push-pull signal according to the pair of record marks ML and MR can be preferably recognized.

(3) Modified Examples

Next, with reference to FIG. 15A to FIG. 26C, modified examples of the optical disc 11 in the example will be explained.

Incidentally, hereinafter, each example corresponds to a modified example of the mark group MG.

(3-1) First Modified Example

Figure 15A:
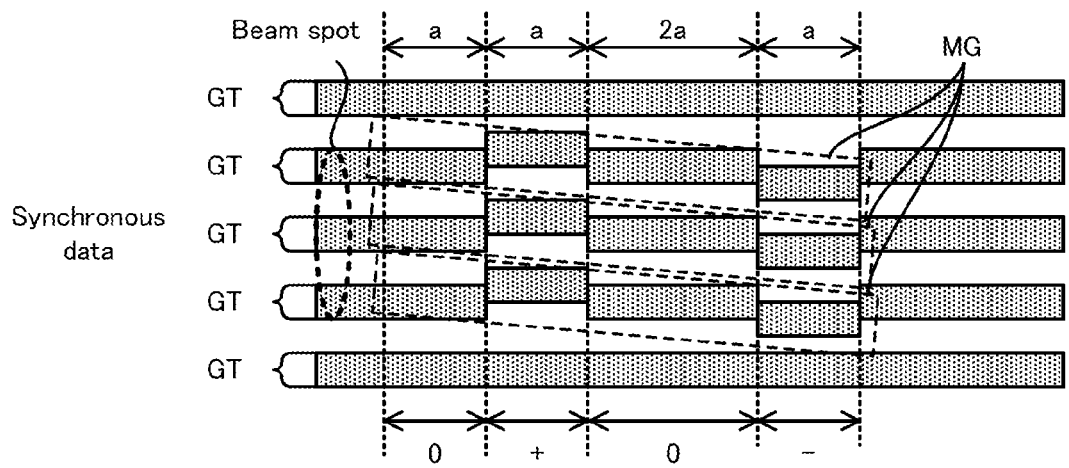
FIG. 15A to FIG. 15C are plan views illustrating a first modified example of the aspect in which many types of data are recorded by the mark groups formed on the groove tracks.
Figure 15B:
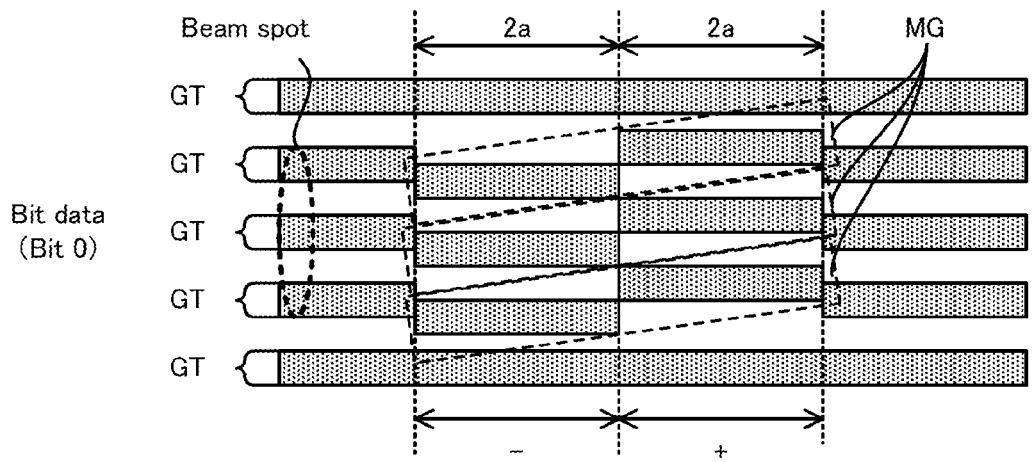
Figure 15C:
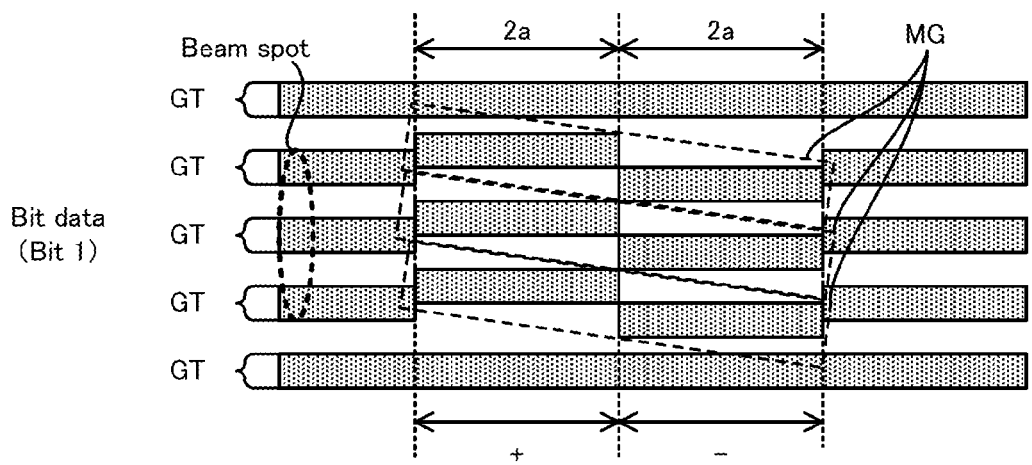
Figure 16A:
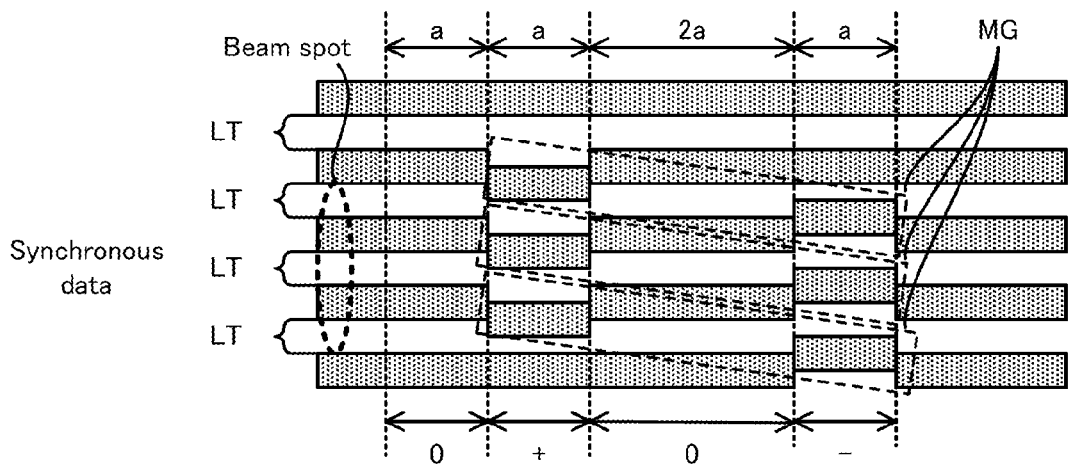
FIG. 16A to FIG. 16C are plan views illustrating a first modified example of the aspect in which many types of data are recorded by the mark groups formed on the land tracks.
Figure 16B:
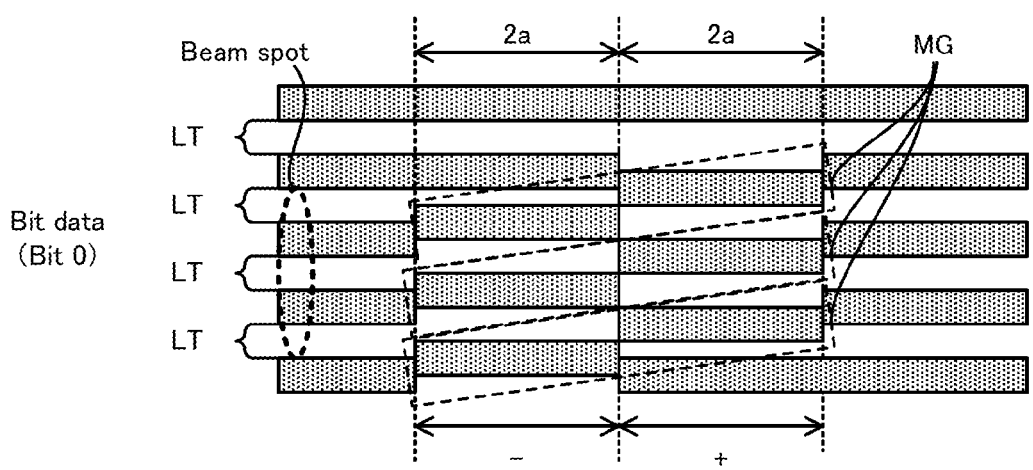
Figure 16C:
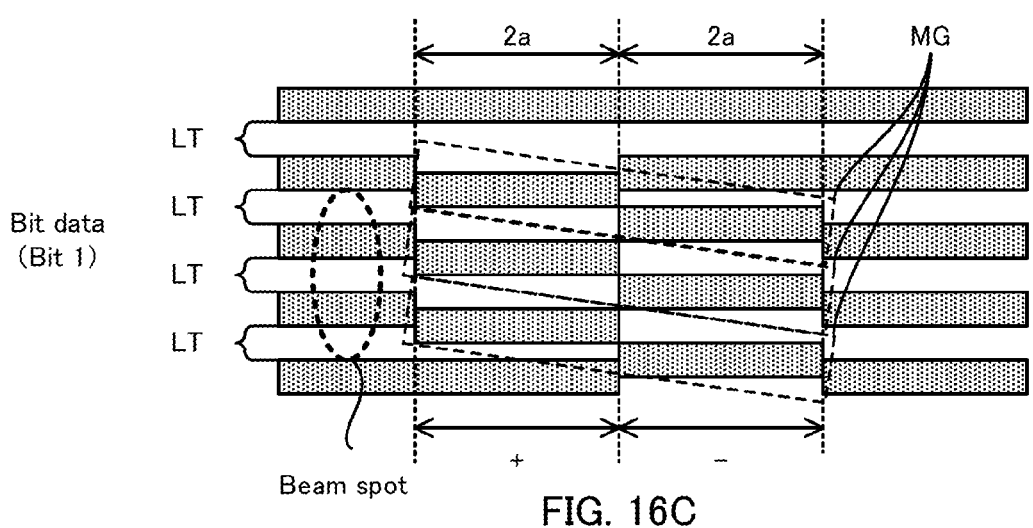

Firstly, with reference to FIG. 15A to FIG. 16C, a first modified example will be explained. FIG. 15A to FIG. 15C are plan views illustrating a first modified example of the aspect in which many types of data are recorded by the mark groups MG formed on the groove tracks GT. FIG. 16A to FIG. 16C are plan views illustrating a first modified example of the aspect in which many types of data are recorded by the mark groups MG formed on the land tracks LT.

As illustrated in FIG. 15A to FIG. 16C, in the first modified example, the length of each of the record marks ML and MR which constitute the synchronous data is different from the length of each of the record marks ML and MR which constitute the bit data. More specifically, as illustrated in FIG. 15A and FIG. 16A, the length of each of the record marks ML and MR which constitute the synchronous data is "a". On the other hand, as illustrated in FIG. 15B, FIG. 15C, FIG. 16B, and FIG. 16C, the length of each of the record marks ML and MR which constitute the bit data is "2a".

Alternatively, as illustrated in FIG. 15A and FIG. 16A, even in the mark group MG which constitutes the synchronous data, the length of each of the record mark ML and MR may be different from the length of each of the record mark MC (particularly, the record mark MC located in a middle portion of the synchronous data) and the area having no record mark formed (particularly, the area having no record mark formed, located in the middle portion of the synchronous data). More specifically, the length of each of the record mark ML and MR may be "a", while the length of each of the record mark MC and the area having no record mark formed may be "2a". Incidentally, the mark groups MG illustrated in FIG. 15A and FIG. 16A can be an example which differentiates the length of the record mark MC located in a top portion of the synchronous data and the length of the record mark MR located in a tail portion, from the length of the record mark MC located in the middle portion of the synchronous data and the length of the area having no record mark formed.

By virtue of such a configuration, the synchronous data and the bit data can be indicated by using the length of each of the record marks MR and ML, the record mark MC, and the area having no record mark formed. In other words, the synchronous data and the bit data can be read even from the length of each of the record marks MR and ML, the record mark MC, and the area having no record mark formed. Therefore, it is possible to relatively improve the reliability of the reading of the synchronous data and the bit data.

Incidentally, the mark groups MG illustrated in FIG. 15A to FIG. 16C are merely one example. Using an aspect other than the aspect illustrated in FIG. 15A to FIG. 16C, it is also possible to realize a state in which the lengths of the record marks which constitute each of the mark groups MG formed on the groove tracks GT are different, and a state in which the lengths of the record marks which constitute each of the mark groups MG formed on the land tracks LT are different.

(3-2) Second Modified Example

Figure 17A:
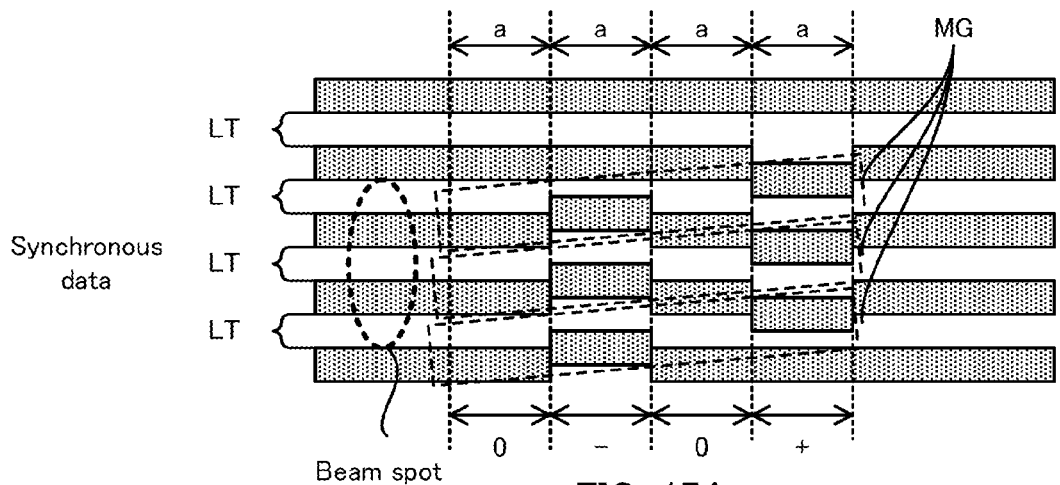
FIG. 17A to FIG. 17C are plan views illustrating a second modified example of the aspect in which many types of data are recorded by the mark groups formed on the land tracks.
Figure 17B:
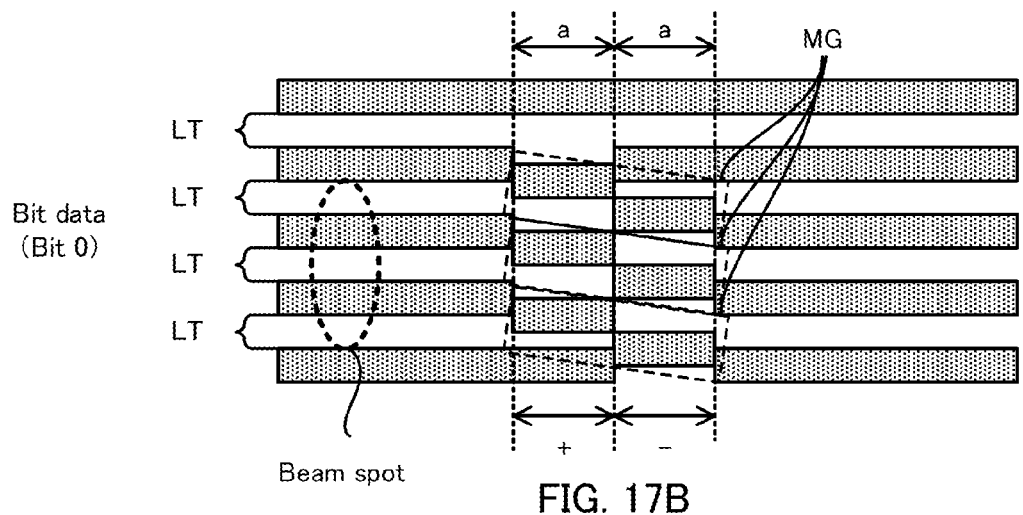
Figure 17C:
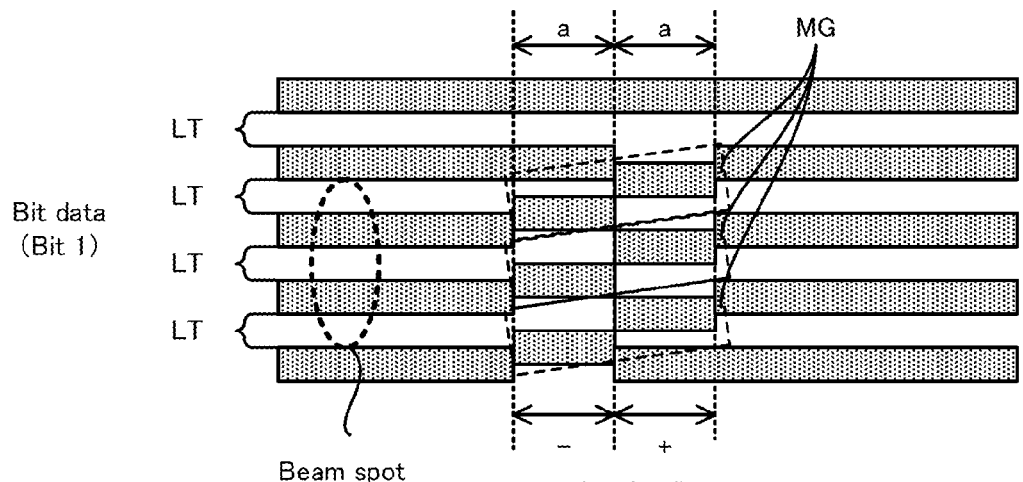

Next, with reference to FIG. 17A to FIG. 17C, a second modified example will be explained. FIG. 17A to FIG. 17C are plan views illustrating the second modified example of the aspect in which many types of data are recorded by the mark groups MG formed on the land tracks LT.

As illustrated in FIG. 17A to FIG. 17C, in the second modified example, the pattern of the pair of record marks MR and ML which constitutes the synchronous data and the bit data indicated by the mark groups MG formed on the groove tracks GT is different from the pattern of the pair of record marks MR and ML which constitutes the synchronous data and the bit data indicated by the mark groups MG formed on the land tracks LT.

Specifically, the mark groups MG formed on the groove tracks GT indicate the synchronous data and the bit data in the same aspect as in FIG. 4A to FIG. 4C. In the other words, the mark group MG in which the record mark MC, the record mark ML, the record mark MC and the record mark MR are arranged in this order indicates the synchronous data. That is, the push-pull signal in which the signal level changes in order of "0", "+", "0" and "−" corresponds to the synchronous data. The mark group MG in which the record mark MR and the record mark ML are arranged in this order indicates the bit data having bit 0. In other words, the push-pull signal in which the signal level changes in order of "−" and "+" corresponds to the bit data having bit 0. The mark group MG in which the record mark ML and the record mark MR are arranged in this order indicates the bit data having bit 1. In other words, the push-pull signal in which the signal level changes in order of "+" and "−" corresponds to the bit data having bit 1.

On the other hand, the mark groups MG formed on the land tracks LT indicate the synchronous data and the bit data in the same aspect as in FIG. 17A to FIG. 17C. In the other words, the mark group MG in which the area having nor record mark formed, the record mark MR, the area having nor record mark formed, and the record mark ML are arranged in this order indicates the synchronous data. That is, the push-pull signal in which the signal level changes in order of "0", "−", "0" and "+" corresponds to the synchronous data. The mark group MG in which the record mark ML and the record mark MR are arranged in this order indicates the bit data having bit 0. In other words, the push-pull signal in which the signal level changes in order of "+" and "−" corresponds to the bit data having bit 0. The mark group MG in which the record mark MR and the record mark ML are arranged in this order indicates the bit data having bit 1. In other words, the push-pull signal in which the signal level changes in order of "−" and "+" corresponds to the bit data having bit 1.

By virtue of such a configuration, it is possible to distinguish between the mark group MG formed on the groove track GT and the mark group MG formed on the land track LT by using the pattern of the record marks MR and ML, the record mark MC, and the area having no record mark formed. Therefore, it is possible to relatively improve the reliability of the reading of the synchronous data and the bit data.

Incidentally, the mark groups MG illustrated in FIG. 17A to FIG. 17C are merely one example. Using an aspect other than the aspect illustrated in FIG. 17A to FIG. 17C, it is also possible to realize a state in which the pattern of the mark groups MG formed on the groove tracks GT is different from the pattern of the mark groups MG formed on the land tracks LT.

(3-3) Third Modified Example

Figure 18A:
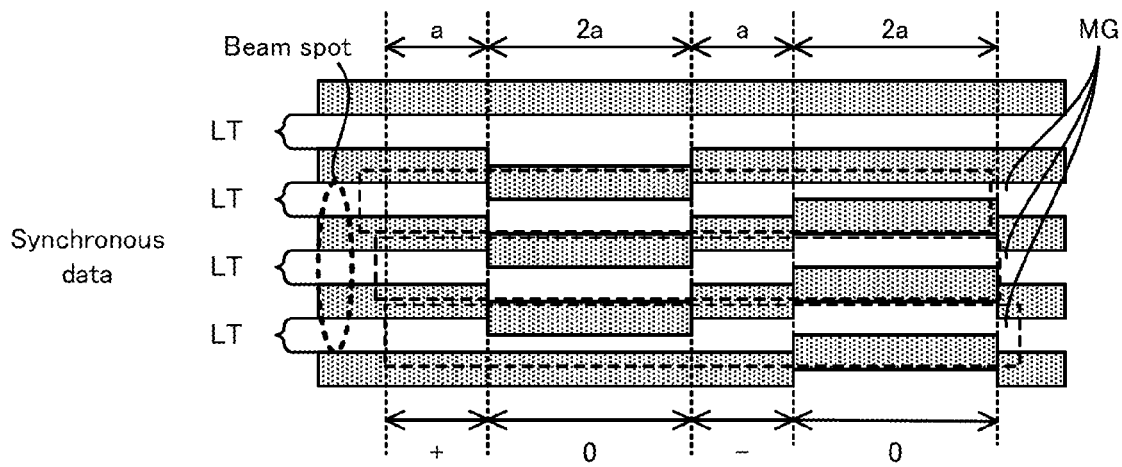
FIG. 18A to FIG. 18C are plan views illustrating a third modified example of the aspect in which many types of data are recorded by the mark groups formed on the land tracks.
Figure 18B:
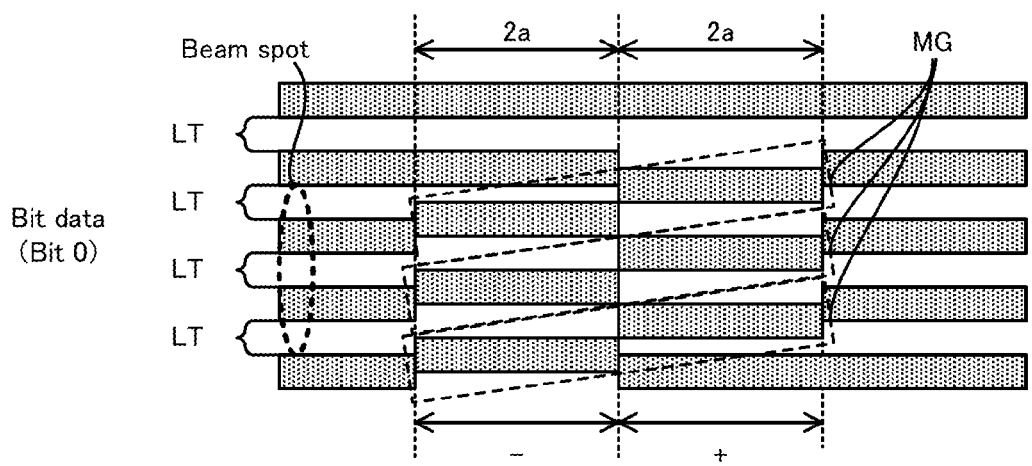
Figure 18C:
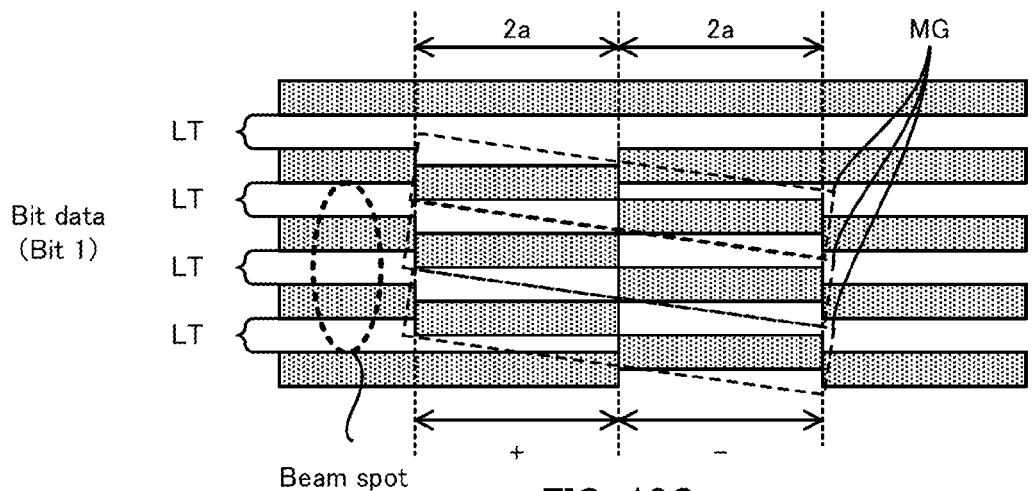

Next, with reference to FIG. 18A to FIG. 18C, a third modified example will be explained. FIG. 18A to FIG. 18C are plan views illustrating the third modified example of the aspect in which many types of data are recorded by the mark groups MG formed on the land tracks LT.

As illustrated in FIG. 18A to FIG. 18C, in the third modified example, the length of the pair of record marks MR and ML which constitutes each of the mark groups MG formed on the groove tracks GT is different from the length of the pair of record marks MR and ML which constitutes each of the mark groups MG formed on the land tracks LT.

Specifically, the mark groups MG formed on the groove tracks GT indicate the synchronous data and the bit data in the same aspect as in FIG. 4. In other words, the length of each of the record mark MC, the record mark ML and the record mark MR which constitute each of the mark groups MG formed on the groove tracks GT is "a".

On the other hand, the mark groups MG formed on the land tracks LT indicate the synchronous data and the bit data in an aspect illustrated in FIG. 18. In other words, the length of each of the record mark MC, the record mark ML and the record mark MR which constitute each of the mark groups MG formed on the land tracks LT is "2a".

By virtue of such a configuration, it is possible to distinguish between the mark group MG formed on the groove track GT and the mark group MG formed on the land track LT by using the length of each of the record marks MR and ML. Therefore, it is possible to relatively improve the reliability of the reading of the synchronous data and the bit data.

Incidentally, the mark groups MG illustrated in FIG. 18A to FIG. 18C are merely one example. Using an aspect other than the aspect illustrated in FIG. 18A to FIG. 18C, it is also possible to realize a state in which the lengths of the record marks which constitute each of the mark groups MG formed on the groove tracks GT are different from the lengths of the record marks which constitute each of the mark groups MG formed on the land tracks LT.

(3-4) Fourth Modified Example

Figure 19A:
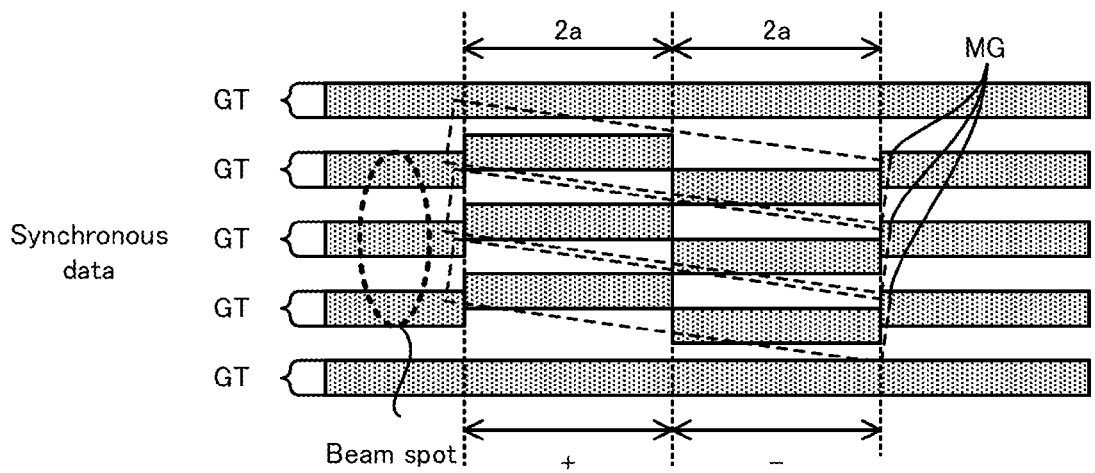
FIG. 19A to FIG. 19C are plan views illustrating a fourth modified example of the aspect in which many types of data are recorded by the mark groups formed on the groove tracks.
Figure 19B:
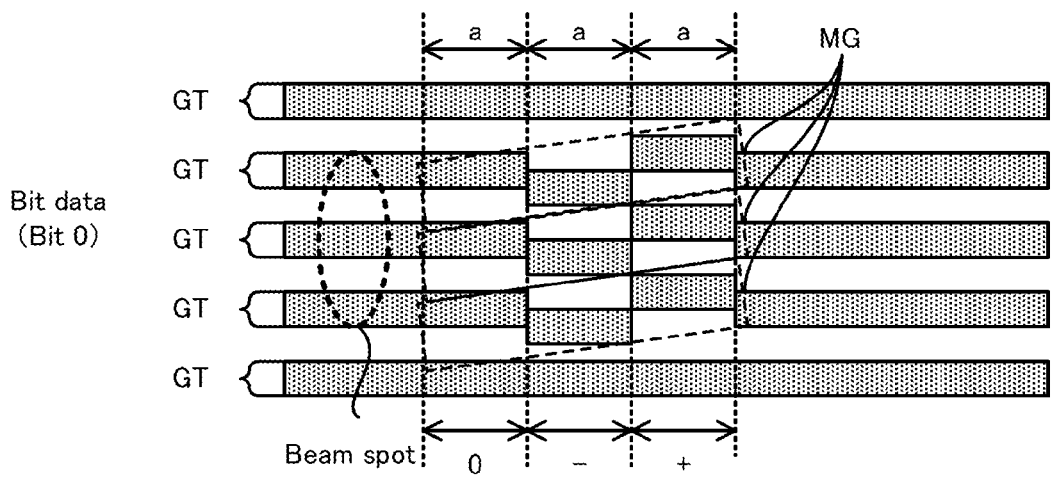
Figure 19C:
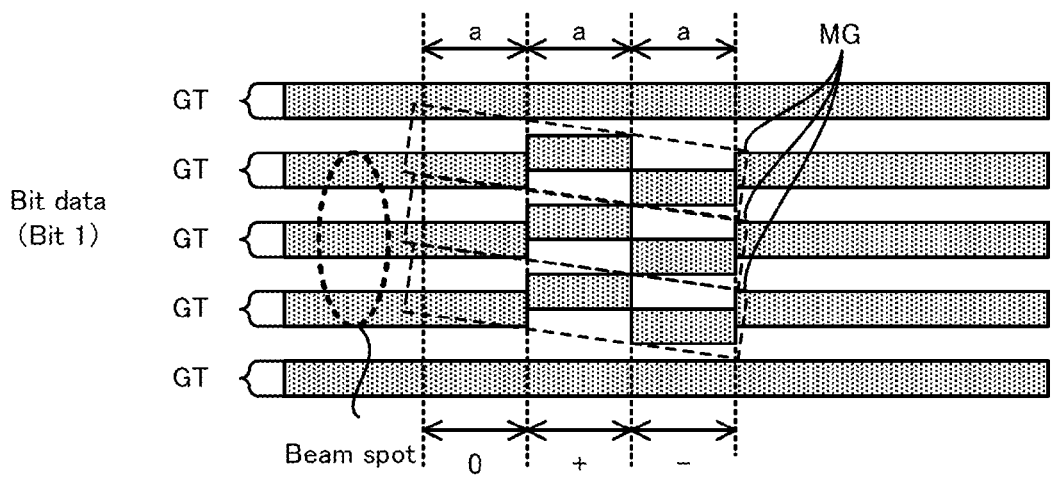
Figure 20A:
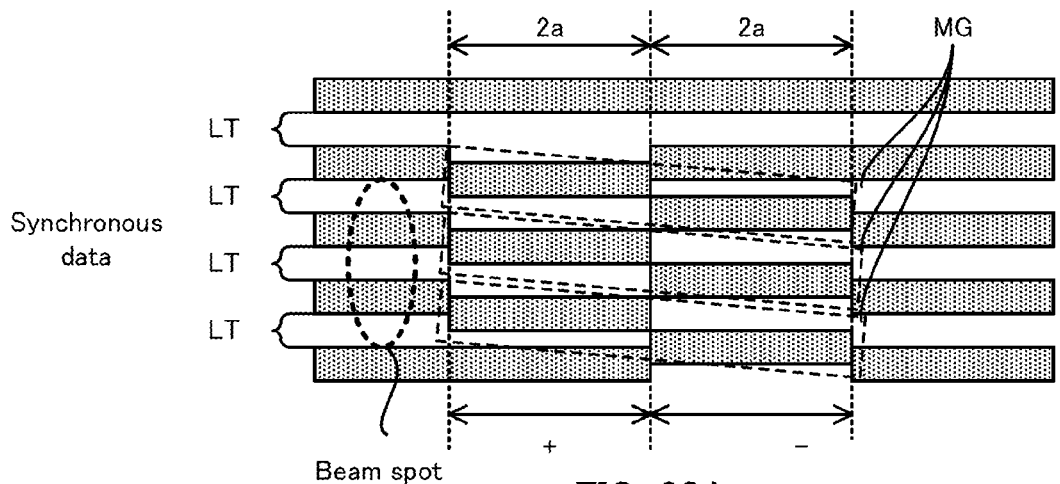
FIG. 20A to FIG. 20C are plan views illustrating a fourth modified example of the aspect in which many types of data are recorded by the mark groups formed on the land tracks.
Figure 20B:
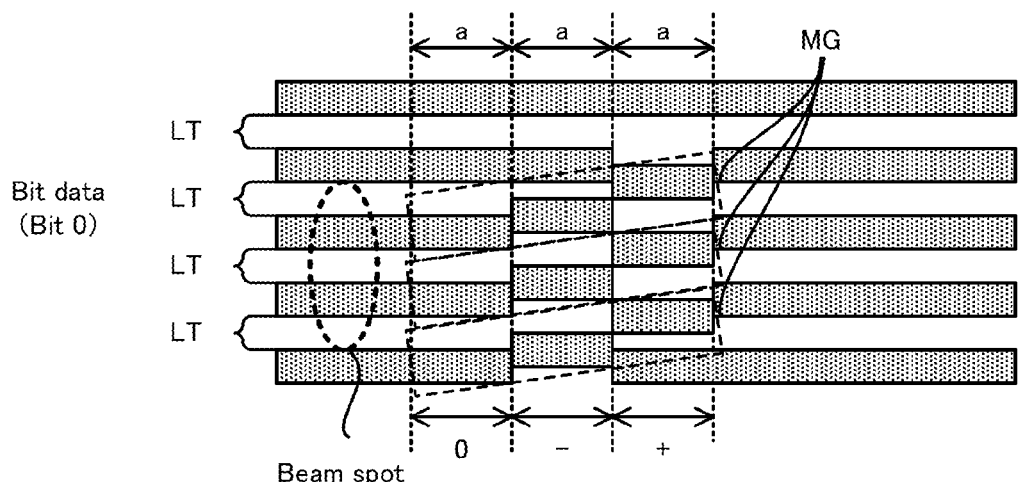
Figure 20C:
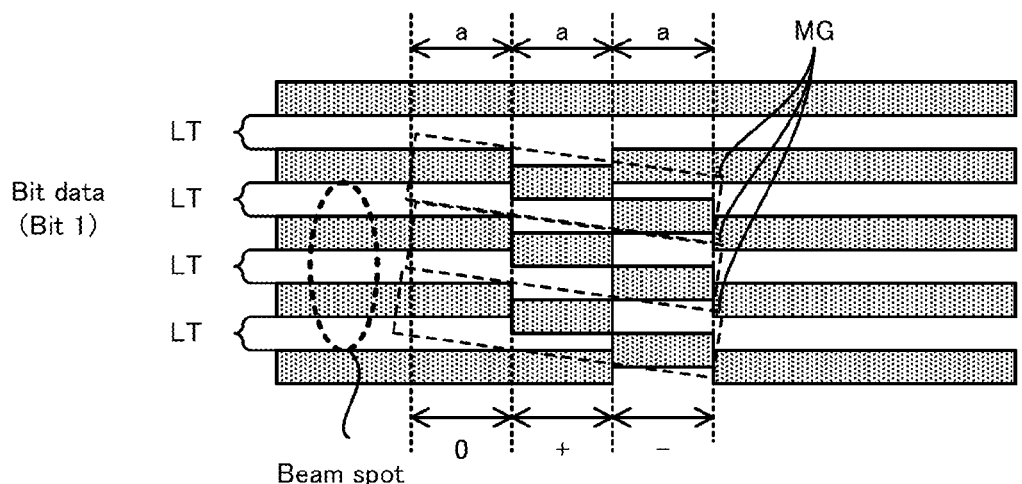

Next, with reference to FIG. 19A to FIG. 20C, a fourth modified example will be explained. FIG. 19A to FIG. 19C are plan views illustrating a fourth modified example of the aspect in which many types of data are recorded by the mark groups MG formed on the groove tracks GT. FIG. 20A to FIG. 20C are plan views illustrating a fourth modified example of the aspect in which many types of data are recorded by the mark groups MG formed on the land tracks LT.

As illustrated in FIG. 19A to FIG. 19C, in the fourth modified example, the pattern of the mark groups MG formed on the groove tracks GT is different from the pattern of the mark groups MG explained using FIG. 4A to FIG. 4C described above. For example, in the fourth modified example, the record mark MC located on the track center is used to indicate the bit data, instead of indicating the synchronous data. Moreover, in the fourth modified example, for example, as in the first modified example, the length of the pair of record marks ML and MR which constitutes the synchronous data is different from the length of the pair of record marks ML and MR which constitutes the bit data.

Specifically, as illustrated in FIG. 19A, the mark groups MG in each of which (i) the record mark ML which is shifted by the predetermined distance to the left side from the track center and (ii) the record mark MR which is shifted by the predetermined distance to the right side from the track center are arranged in this order along the direction of travel of the groove track GT may be recorded on the groove tracks GT as the mark groups MG each of which constitutes the synchronous data. Incidentally, FIG. 19A illustrates an example in which the length of each of the record mark ML and the record mark MR is "2a".cc As illustrated in FIG. 19B, the mark groups MG in each of (i) which the record mark MC which is located on the track center, (ii) the record mark MR which is shifted by the predetermined distance to the right side from the track center and (iii) the record mark ML which is shifted by the predetermined distance to the left side from the track center are arranged in this order along the direction of travel of the groove track GT may be recorded on the groove tracks GT as the mark groups MG each of which constitutes the bit data indicating bit 0. Incidentally, FIG. 19B illustrates an example in which the length of each of the record mark MC, the record mark ML and the record mark MR is "a". Incidentally, FIG. 19B illustrates an example in which the record mark MC is arranged in front of the record mark MR (i.e. in the top portion of the bit data). However, the record mark MC may be arranged between the record mark MR and the record mark ML (i.e. in the middle portion of the bit data) or may be arranged behind the record mark ML (i.e. in the tail portion of the bit data).

As illustrated in FIG. 19C, the mark groups MG in each of (i) which the record mark MC which is located on the track center, (ii) the record mark ML which is shifted by the predetermined distance to the left side from the track center, and (iii) the record mark MR which is shifted by the predetermined distance to the right side from the track center are arranged in this order along the direction of travel of the groove track GT may be recorded on the groove tracks GT as the mark groups MG each of which constitutes the bit data indicating bit 1. Incidentally, FIG. 19C illustrates an example in which the length of each of the record mark MC, the record mark ML and the record mark MR is "a". Incidentally, FIG. 19C illustrates an example in which the record mark MC is arranged in front of the record mark ML (i.e. in the top portion of the bit data). However, the record mark MC may be arranged between the record mark ML and the record mark MR (i.e. in the middle portion of the bit data) or may be arranged behind the record mark MR (i.e. in the tail portion of the bit data).

As illustrated in FIG. 20A to FIG. 20C, in the fourth modified example, the pattern of the mark groups MG formed on the land tracks LT is different from the pattern of the mark groups MG explained using FIG. 6A to FIG. 6C described above. For example, in the fourth modified example, the area having no record mark formed is used to indicate the bit data, instead of indicating the synchronous data. Moreover, in the fourth modified example, for example, as in the first modified example, the length of the pair of record marks ML and MR which constitutes the synchronous data is different from the length of the pair of record marks ML and MR which constitutes the bit data.

Specifically, as illustrated in FIG. 20A, the mark groups MG in each of which (i) the record mark ML which is shifted by the predetermined distance to the left side from the track center and (ii) the record mark MR which is shifted by the predetermined distance to the right side from the track center are arranged in this order along the direction of travel of the land tracks LT may be recorded on the land tracks LT as the mark groups MG each of which constitutes the synchronous data. Incidentally, FIG. 20A illustrates an example in which the length of each of the record mark ML and the record mark MR is "2a".

As illustrated in FIG. 20B, the mark groups MG in each of which (i) the area having no record mark formed, (ii) the record mark MR which is shifted by the predetermined distance to the right side from the track center and (iii) the record mark ML which is shifted by the predetermined distance to the left side from the track center are arranged in this order along the direction of travel of the land tracks LT may be recorded on the land tracks LT as the mark groups MG each of which constitutes the bit data indicating bit 0. Incidentally, FIG. 20B illustrates an example in which the length of each of the area having no record mark formed, the record mark ML and the record mark MR is "a". Incidentally, FIG. 20B illustrates an example in which the area having no record mark formed is arranged in front of the record mark MR (i.e. in the top portion of the bit data). However, the area having no record mark formed may be arranged between the record mark MR and the record mark ML (i.e. in the middle portion of the bit data) or may be arranged behind the record mark ML (i.e. in the tail portion of the bit data).

As illustrated in FIG. 20C, the mark groups MG in each of which (i) the area having no record mark formed, (ii) the record mark ML which is shifted by the predetermined distance to the left side from the track center, and (iii) the record mark MR which is shifted by the predetermined distance to the right side from the track center are arranged in this order along the direction of travel of the land tracks LT may be recorded on the land tracks LT as the mark groups MG each of which constitutes the bit data indicating bit 1. Incidentally, FIG. 20C illustrates an example in which the length of each of the area having no record mark formed, the record mark ML and the record mark MR is "a". Incidentally, FIG. 20C illustrates an example in which the area having no record mark formed is arranged in front of the record mark ML (i.e. in the top portion of the bit data). However, the area having no record mark formed may be arranged between the record mark ML and the record mark MR (i.e. in the middle portion of the bit data) or may be arranged behind the record mark MR (i.e. in the tail portion of the bit data).

Even in such a configuration, as in the first modified example, it is possible to relatively improve the reliability of the reading of the synchronous data and the bit data. In addition, since the record mark MC or the area having no record mark formed is arranged in the top portion of the data bit (i.e. the signal level of the push-pull signal corresponding to the top portion of the data bit is zero), the border of the bit data becomes clear.

Incidentally, the mark groups MG illustrated in FIG. 19A to FIG. 20C are merely one example. The mark groups MG may be formed in an aspect other than the aspect illustrated in FIG. 19A to FIG. 20C.

(3-5) Fifth Modified Example

Figure 21A:
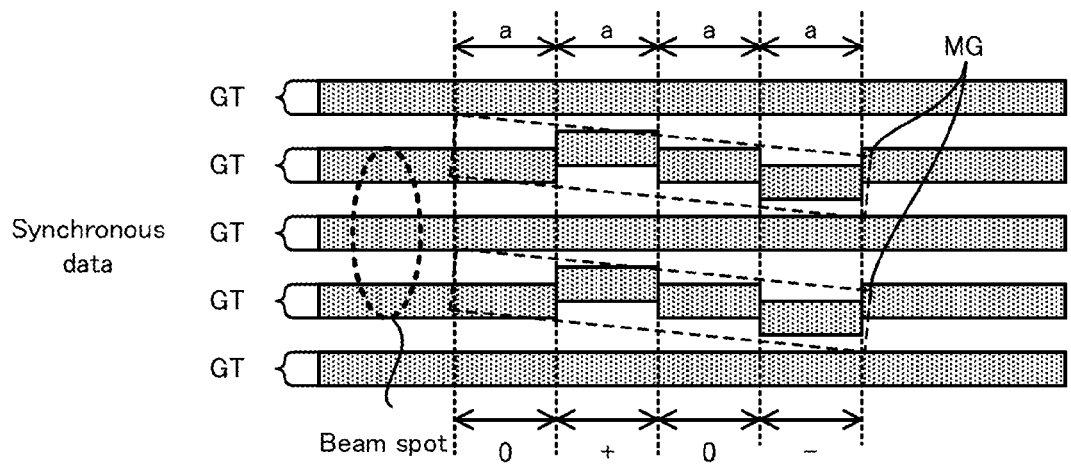
FIG. 21A to FIG. 21C are plan views illustrating a fifth modified example of the aspect in which many types of data are recorded by the mark groups formed on the groove tracks.
Figure 21B:
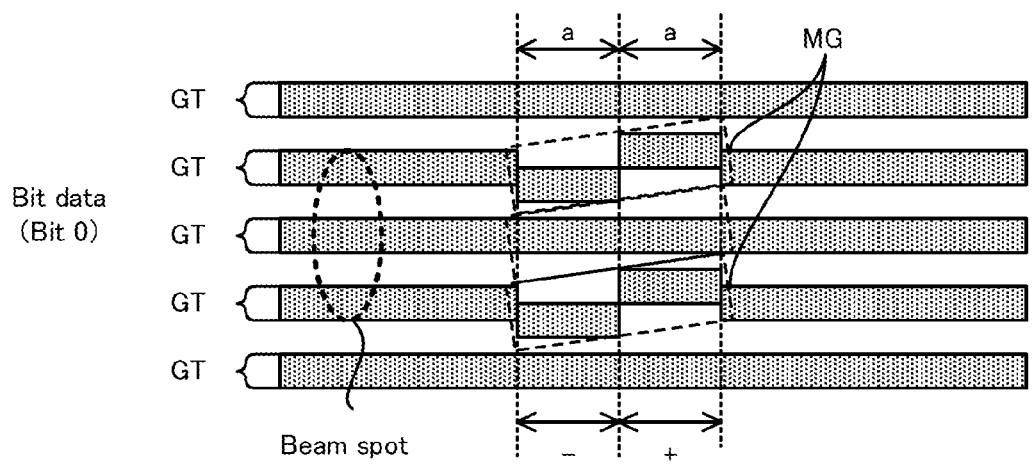
Figure 21C:
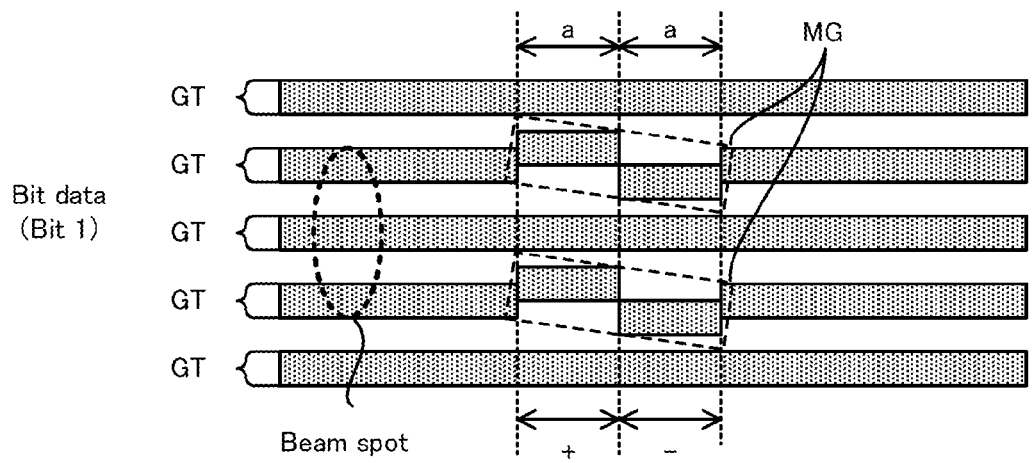
Figure 22A:
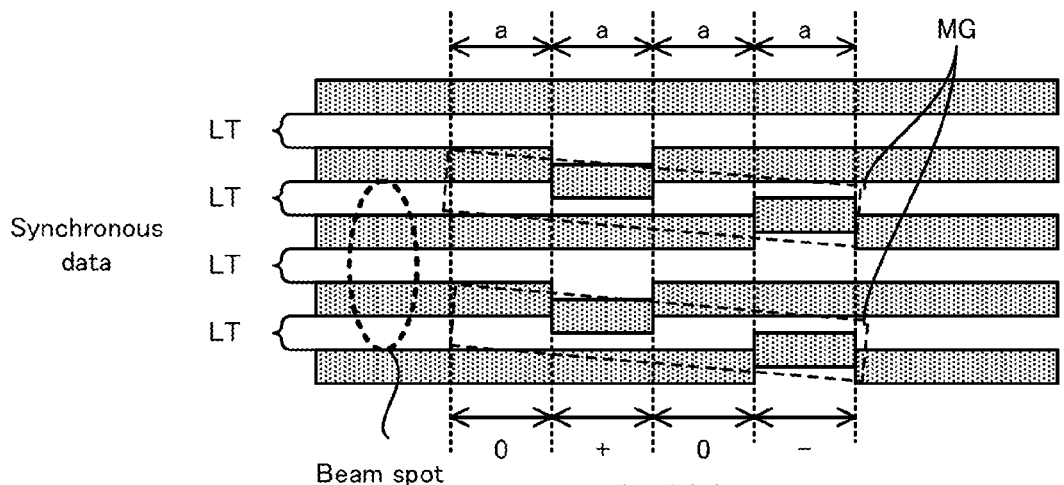
FIG. 22A to FIG. 22C are plan views illustrating a fifth modified example of the aspect in which many types of data are recorded by the mark groups formed on the land tracks.
Figure 22B:
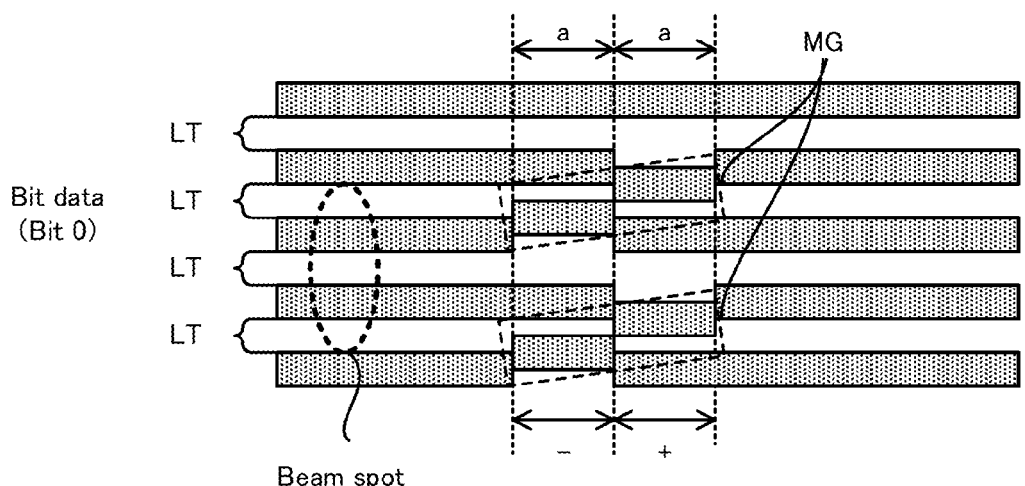
Figure 22C:
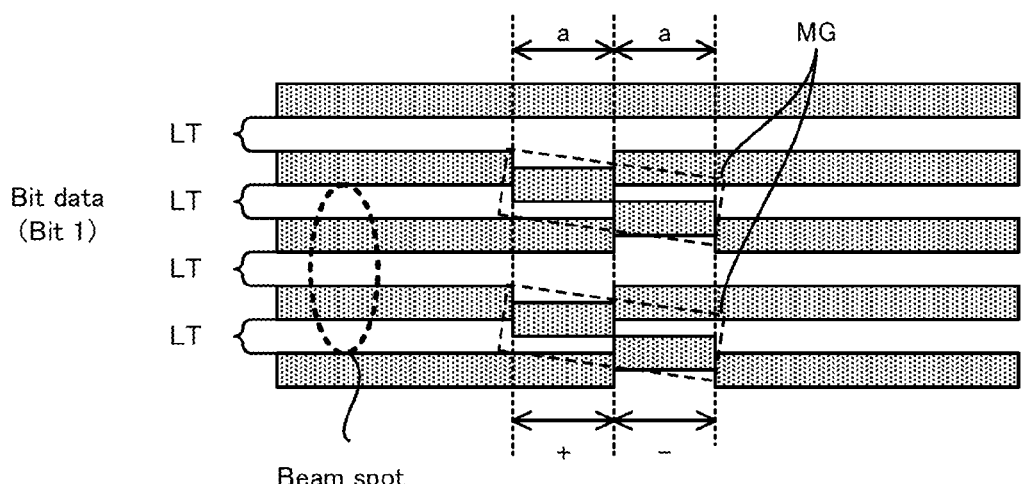

Next, with reference to FIG. 21A to FIG. 22C, a fifth modified example will be explained. FIG. 21A to FIG. 21C are plan views illustrating a fifth modified example of the aspect in which many types of data are recorded by the mark groups MG formed on the groove tracks GT. FIG. 22A to FIG. 22C are plan views illustrating a fifth modified example of the aspect in which many types of data are recorded by the mark groups MG formed on the land tracks LT.

As illustrated in FIG. 21A to FIG. 21C, in the fifth modified example, the record marks ML and MR described above are not formed on the groove track GT located in the center out of the plurality of groove tracks GT on which the mark groups MG are to be formed. In other words, the record marks ML and MR described above are not formed on the groove track GT designated as a focus position of the guide laser light LB1 when the mark groups MG are searched for, out of the plurality of groove tracks GT on which the mark groups MG are to be formed according to the aspect illustrated in FIG. 4A to FIG. 4C. For example, it is assumed that the mark group MG(k) is formed on each of the groove track GT with a track number of "k−2", the groove track GT with a track number of "k", and the groove track GT with a track number of "k+2". In this case, according to the fifth modified example, the mark group MG(k) is formed on each of the groove track GT with a track number of "k−2" and the groove track GT with a track number of "k+2", while the mark group MG(k) is not formed on the groove track GT with a track number of "k".

In the same manner, as illustrated in FIG. 22A to FIG. 22C, the record marks ML and MR described above are not formed on the land track LT located in the center out of the plurality of land tracks LT on which the mark groups MG are to be formed. In other words, the record marks ML and MR described above are not formed on the land track LT designated as a focus position of the guide laser light LB1 when the mark groups MG are searched for, out of the plurality of land tracks LT on which the mark groups MG are to be formed according to the aspect illustrated in FIG. 6A to FIG. 6C. For example, it is assumed that the mark group MG(k+1) is formed on each of the land track LT with a track number of "k−1", the land track LT with a track number of "k+1", and the land track LT with a track number of "k+3". In this case, according to the fifth modified example, the mark group MG(k+1) is formed on each of the land track LT with a track number of "k−1" and the land track LT with a track number of "k+3", while the mark group MG(k+1) is not formed on the land track LT with a track number of "k+1".

By virtue of such a configuration, the number of the record marks MR and ML to be formed on the guide layer 12 is relatively reduced, which simplifies a manufacturing process of the optical disc 11.

(3-6) Sixth Modified Example

Next, with reference to FIG. 23A to FIG. 23G, a sixth modified example will be explained. FIG. 23A to FIG. 23G are plan views illustrating the sixth modified example of the aspect in which many types of data are recorded by the mark groups MG formed on the groove tracks GT.

As illustrated in FIG. 23A to FIG. 23G, in the sixth modified example, the number of the record marks ML which constitute the certain mark group MG is equal to the number of the record marks MR which constitute the same certain mark group MG. Incidentally, FIG. 23A to FIG. 23G illustrate examples of the mark group MG indicating seven types of bit data while satisfying the condition that the number of the record marks ML is equal to the number of the record marks MR.

Incidentally, FIG. 23A to FIG. 23G illustrate the aspect in which many types of data are recorded by the mark groups MG formed on the groove tracks GT. However, it is preferable that the number of the record marks ML which constitute the mark group MG would be equal to the number of the record marks MR which constitute the mark group MG even if many types of data are recorded by the mark groups MG formed on the land tracks LT.

By virtue of such a configuration, an average value (i.e. an integrated value) of the variation in the signal level of the push-pull signal is zero. Therefore, even if the mark groups MG are formed on the guide tracks TR, the mark groups MG hardly have or do not have a significant adverse influence on the tracking control based on the push-pull signal. Therefore, even if the mark groups MG are formed on the guide tracks TR, the tracking control is preferably performed, substantially as in cases where the mark groups MG are not formed on the guide tracks TR.

(3-7) Seventh Modified Example

Figure 24A:
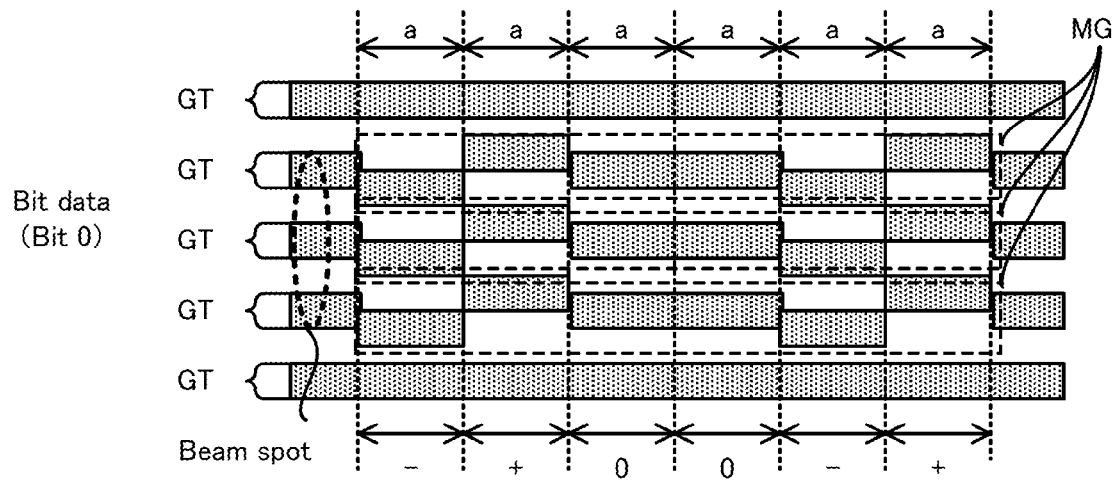
FIG. 24A and FIG. 24B are plan views illustrating a seventh modified example of the aspect in which many types of data are recorded by the mark groups formed on the groove tracks.
Figure 24B:
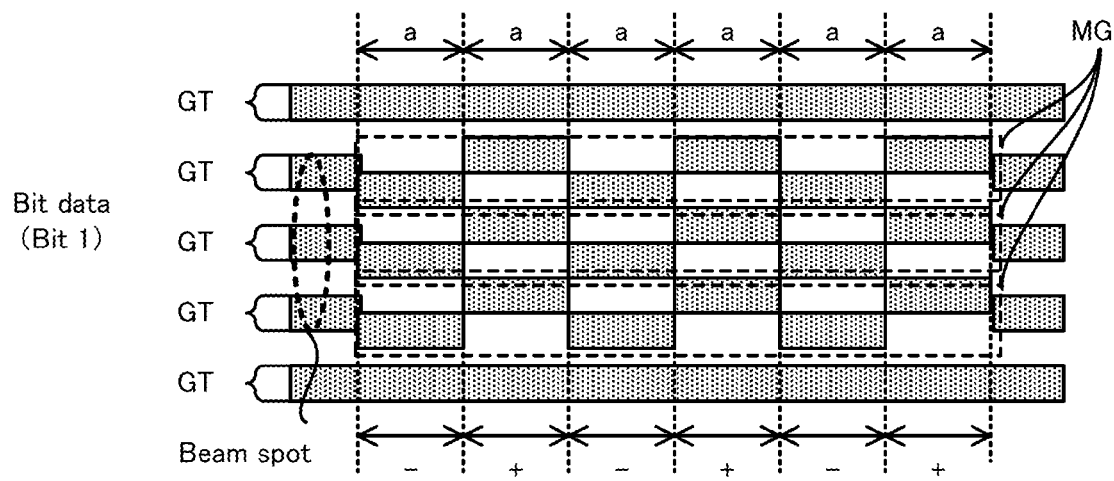

Next, with reference to FIG. 24A and FIG. 24B, a seventh modified example will be explained. FIG. 24A and FIG. 24B are plan views illustrating the seventh modified example of the aspect in which many types of data are recorded by the mark groups MG formed on the groove tracks GT.

As illustrated in FIG. 24A and FIG. 24B, in the seventh modified example, the pair of record marks MR and ML is disposed in each of the top portion and the tail portion of the bit data, the bit data indicating bit 0 and the bit data indicating bit 1 are distinguished by whether or not the pair of record marks MR and ML is arranged in an area between the two pairs of record marks MR and ML (i.e. in the middle portion of the bit data). Specifically, as illustrated in FIG. 24A, the mark group MG in which the pair of record marks MR and ML is not arranged in the area between the two pairs of record marks MR and ML constitutes the bit data indicating bit 0. On the other hand, as illustrated in FIG. 24B, the mark group MG in which the pair of record marks MR and ML is arranged in the area between the two pairs of record marks MR and ML constitutes the bit data indicating bit 1.

Even in such a configuration, it is possible to relatively improve the reliability of the reading of the bit data.

(3-8) Eighth Modified Example

Figure 25:
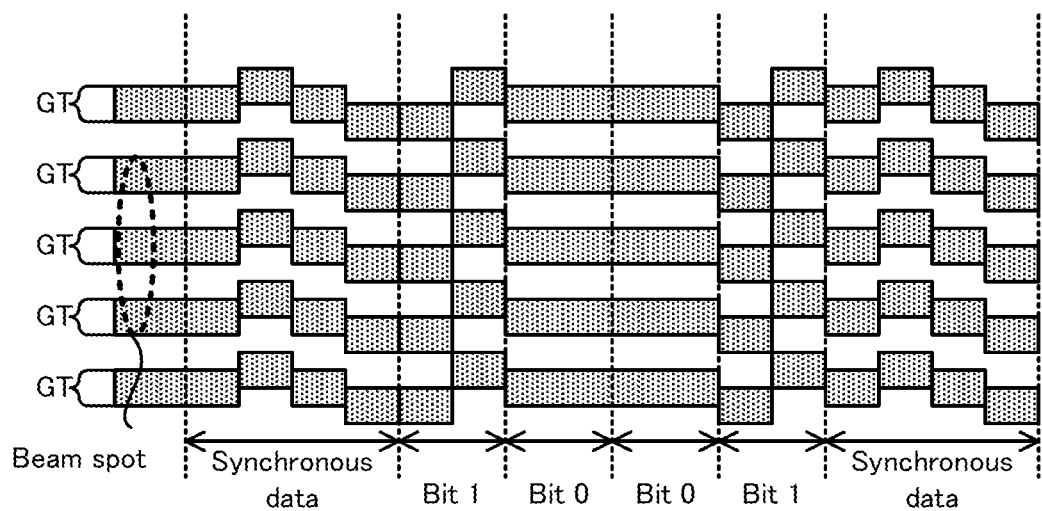
FIG. 25 is a plan views illustrating an eighth modified example of the aspect in which many types of data are recorded by the mark groups formed on the groove tracks.

Next, with reference to FIG. 25, an eighth modified example will be explained. FIG. 25 is a plan view illustrating the eighth modified example of the aspect in which many types of data are recorded by the mark groups MG formed on the groove tracks GT.

As illustrated in FIG. 25, in the eighth modified example, the synchronous data is disposed both in front of and behind 4-bit bit data, and then, the bit data indicating bit 0 and the bit data indicating bit 1 are distinguished by whether or not the pair of record marks MR and ML is arranged in an area between the two synchronous data. Specifically, as illustrated in FIG. 25, a portion in which the pair of record marks MR and ML is not arranged in the area between the two synchronous data constitutes the bit data indicating bit 0. On the other hand, as illustrated in FIG. 25, a portion in which the pair of record marks MR and ML is arranged in the area between the two synchronous data constitutes the bit data indicating bit 1.

Even in such a configuration, it is possible to relatively improve the reliability of the reading of the bit data. In addition, according to the eighth modified example, the bit data indicating bit 0 can be represented without using the pair of the record marks ML and MR. Thus, the mark group MG indicating the bit data having bit 0 does not influence the variation in the signal level of the push-pull signal. Therefore, even if the mark groups MG are formed on the guide tracks TR, it is possible to further reduce the possibility that the mark groups MG have a significant adverse influence on the tracking control based on the push-pull signal. Therefore, even if the mark groups MG are formed on the guide tracks TR, the tracking control is preferably performed, substantially as in cases where the mark groups MG are not formed on the guide tracks TR.

(3-9) Ninth Modified Example

Figure 26A:
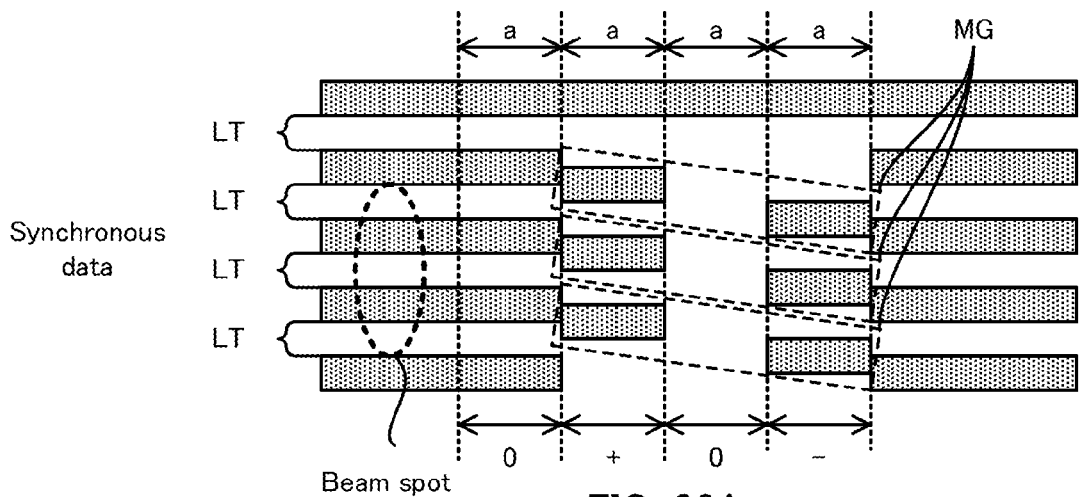
FIG. 26A to FIG. 26C are plan views illustrating a ninth modified example of the aspect in which many types of data are recorded by the mark groups formed on the land tracks.
Figure 26B:
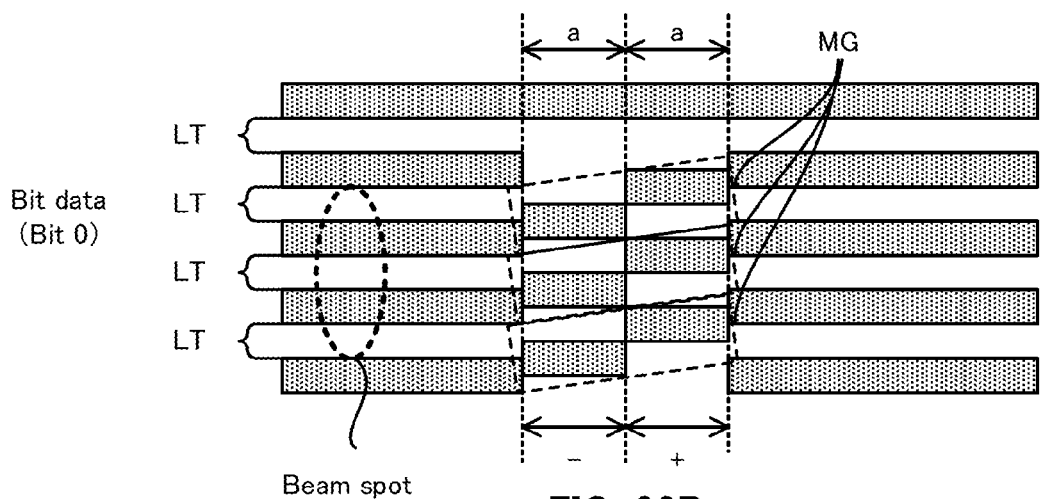
Figure 26C:
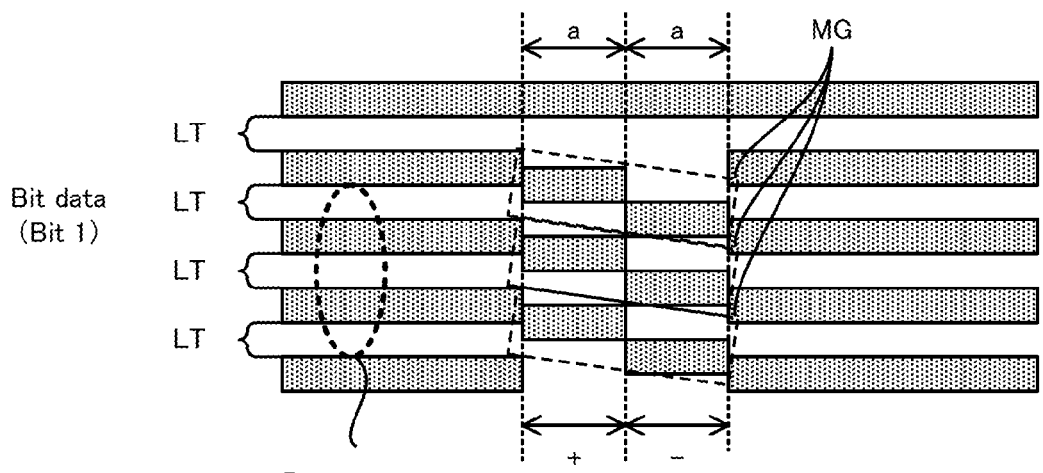

Next, with reference to FIG. 26A to FIG. 26C, a ninth modified example will be explained. FIG. 26A to FIG. 26C are plan views illustrating the ninth modified example of the aspect in which many types of data are recorded by the mark groups MG formed on the land tracks LT.

As illustrated in FIG. 26A to FIG. 26C, in the ninth modified example, the mark groups MG formed on the land tracks LT are formed simultaneously when the land tracks LT are formed.

Incidentally, in the explanations described above, the mark groups MG formed on the land tracks LT are formed simultaneously with the formation of the groove tracks GT, in order to simplify the manufacturing process of the optical disc 11. However, in order to exert an effect of recording the control information into the guide layer 12 using the mark groups MG, the mark groups MG formed on the land tracks LT may be formed simultaneously when the land tracks LT are formed, as illustrated in the ninth modified example.

The invention may be embodied in other specific forms without departing from the spirit or essential characteristics thereof. The present example is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording medium comprising:
   a guide layer on which a guide track or guide tracks for tracking are formed; and
   a plurality of recording layers laminated on the guide layer, wherein,
   a same mark group is formed in a same rotational phase position of each of at least two guide tracks out of a plurality of guide tracks which are included in a beam spot at the same time which is formed on the guide layer by guide laser light irradiated on the guide layer,
   the mark group includes a pair of record marks which are shifted by a predetermined distance toward a right side and a left side, respectively, from a track center of the each guide track, and
   a depth of the pair of record marks is less than $\lambda/6n$, where $\lambda$ is a wavelength of the guide laser light and n is a substrate refractive index of the recording medium.

2. A recording medium comprising:
   a guide layer on which a guide track or guide tracks for tracking are formed; and
   a plurality of recording layers laminated on the guide layer, wherein,
   a same mark group is formed in a same rotational phase position of each of at least two guide tracks out of a plurality of guide tracks which are included in a beam spot at the same time which is formed on the guide layer by guide laser light irradiated on the guide layer,
   the mark group includes a pair of record marks which are shifted by a predetermined distance toward a right side and a left side, respectively, from a track center of the each guide track, and
   a depth of the pair of record marks is $\lambda/8n$, where $\lambda$ is a wavelength of the guide laser light and n is a substrate refractive index of the recording medium.

3. A recording medium comprising:
   a guide layer on which a guide track or guide tracks for tracking are formed; and
   a plurality of recording layers laminated on the guide layer, wherein,
   a same mark group is formed in a same rotational phase position of each of at least two guide tracks out of a plurality of guide tracks which are included in a beam spot at the same time which is formed on the guide layer by guide laser light irradiated on the guide layer, the mark group includes a pair of record marks which are shifted by a predetermined distance toward a right side and a left side, respectively, from a track center of the each guide track, and the mark group includes (i) a mark group including the pair of record marks and (ii) a mark group obtained by combining the pair of record marks with another record mark located on the track center of the each guide track.

4. The recording medium according to claim 3, wherein the mark group including the pair of record marks is a mark group indicating predetermined bit data to be recorded into the guide layer, and the mark group obtained by combining the pair of record marks with another record mark located on the track center is a mark group indicating synchronous data for synchronization when the bit data is read.

5. A recording medium comprising:

a guide layer on which a guide track or guide tracks for tracking are formed; and a plurality of recording layers laminated on the guide layer, wherein, a same mark group is formed in a same rotational phase position of each of at least two guide tracks out of a plurality of guide tracks which are included in a beam spot at the same time which is formed on the guide layer by guide laser light irradiated on the guide layer, the mark group includes a pair of record marks which are shifted by a predetermined distance toward a right side and a left side, respectively, from a track center of the each guide track, and the mark group is formed by combining the pair of record marks such that an average value of a signal level of a push-pull signal is zero, the push-pull signal being obtained by irradiating the guide laser light onto the mark group.

6. A recording medium comprising:

a guide layer on which a guide track or guide tracks for tracking are formed; and a plurality of recording layers laminated on the guide layer, wherein, a same mark group is formed in a same rotational phase position of each of at least two guide tracks out of a plurality of guide tracks which are included in a beam spot at the same time which is formed on the guide layer by guide laser light irradiated on the guide layer, the mark group includes a pair of record marks which are shifted by a predetermined distance toward a right side and a left side, respectively, from a track center of the each guide track, the guide tracks include groove tracks and land tracks alternately formed, a mark group is formed in a same rotational phase position of each of a plurality of groove tracks which are included in the beam spot, the mark group including a pair of record marks which are shifted by a predetermined distance toward a right side and a left side, respectively, from a track center of the each groove track, and a mark group is formed in a same rotational phase position of each of a plurality of land tracks which are included in the beam spot, the mark group including a pair of record marks which are shifted by a predetermined distance toward a right side and a left side, respectively, from a track center of the each land track.

7. The recording medium according to claim 6, wherein the mark group formed on the land track is formed as a mark group which is formed simultaneously with formation of two groove tracks adjacent to the land track.

\* \* \* \* \*